(12) United States Patent
Kim et al.

(10) Patent No.: US 10,297,864 B2
(45) Date of Patent: May 21, 2019

(54) COMPOSITE ELECTROLYTE AND LITHIUM BATTERY INCLUDING THE ELECTROLYTE

(71) Applicant: Samsung Electronics Co., Ltd., Suwon-si, Gyeonggi-do (KR)

(72) Inventors: Jusik Kim, Seongnam-si (KR); Jenam Lee, Seongnam-si (KR); Soyeon Kim, Suwon-si (KR); Hyunseok Kim, Suwon-si (KR); Joungwon Park, Yongin-si (KR); Seoksoo Lee, Yongin-si (KR); Hyorang Kang, Anyang-si (KR)

(73) Assignee: SAMSUNG ELECTRONICS CO., LTD., Gyeonggi-do (KR)

(*) Notice: Subject to any disclaimer, the term of this patent is extended or adjusted under 35 U.S.C. 154(b) by 277 days.

(21) Appl. No.: 14/820,021

(22) Filed: Aug. 6, 2015

(65) Prior Publication Data
US 2016/0181658 A1 Jun. 23, 2016

(30) Foreign Application Priority Data
Dec. 19, 2014 (KR) .................. 10-2014-0184969

(51) Int. Cl.
*H01M 10/0569* (2010.01)
*H01M 10/052* (2010.01)

(52) U.S. Cl.
CPC ..... *H01M 10/0569* (2013.01); *H01M 10/052* (2013.01); *H01M 2300/0028* (2013.01); *H01M 2300/0045* (2013.01)

(58) Field of Classification Search
CPC ................................................ H01M 10/0569
See application file for complete search history.

(56) References Cited

U.S. PATENT DOCUMENTS

| 7,700,241 B2 | 4/2010 | Best et al. | |
| 2007/0015061 A1* | 1/2007 | Klaassen | H01M 4/13 429/322 |
| 2008/0044734 A1* | 2/2008 | Ryu | H01M 4/13 429/326 |
| 2008/0248381 A1* | 10/2008 | Hennige | H01M 2/145 429/129 |
| 2012/0003532 A1* | 1/2012 | Badding | H01M 4/0452 429/215 |

(Continued)

FOREIGN PATENT DOCUMENTS

| JP | 2012142297 A | 7/2012 |
| JP | 201413693 A | 1/2014 |

(Continued)

OTHER PUBLICATIONS

Anne-Laure Pont, Rebeca Marcilla, Pyrrolidinium-based polymeric ionic liquids as mechanically and electrochemically stable polymer electrolytes, 2008, Journal pf Power Sources.*

(Continued)

*Primary Examiner* — Sarah A. Slifka
*Assistant Examiner* — Brian R Ohara
(74) *Attorney, Agent, or Firm* — Cantor Colburn LLP

(57) ABSTRACT

A composite electrolyte including a polymeric ionic liquid; and an oligomeric electrolyte, wherein the oligomeric electrolyte includes an oligomer.

19 Claims, 8 Drawing Sheets

(56) References Cited

U.S. PATENT DOCUMENTS

| | | | | |
|---|---|---|---|---|
| 2012/0301774 A1* | 11/2012 | Jiang | ................. | H01M 2/145 |
| | | | | 429/144 |
| 2013/0273435 A1 | 10/2013 | Leitner et al. | | |
| 2014/0106186 A1* | 4/2014 | Dudney | .............. | H01M 4/0426 |
| | | | | 429/50 |
| 2014/0160549 A1* | 6/2014 | Sandberg | .............. | H01M 6/181 |
| | | | | 359/265 |
| 2015/0155566 A1* | 6/2015 | Kim | ................. | H01M 4/9083 |
| | | | | 252/514 |
| 2016/0064770 A1* | 3/2016 | Lee | .................. | H01M 4/382 |
| | | | | 429/303 |
| 2016/0064773 A1* | 3/2016 | Choi | ................ | H01M 10/0565 |
| | | | | 429/303 |
| 2016/0064785 A1* | 3/2016 | Kim | ................. | H01M 12/08 |
| | | | | 429/405 |

FOREIGN PATENT DOCUMENTS

| | | |
|---|---|---|
| KR | 100278539 B1 | 1/2000 |
| KR | 1020080002643 A | 1/2008 |
| KR | 1020140061501 A | 5/2014 |
| KR | 1020140074540 A | 6/2014 |
| WO | 2013134566 A3 | 9/2013 |

OTHER PUBLICATIONS

Definition monomer (Year: 2017).*
Patrick E. Trapa et al., "Rubbery Craft Copolymer Electrolytes for Solid-State, Thin-Film Lithium Batteries", Journal of the Electrochemical Society, 152 (1) A1-A5 (2005).

* cited by examiner

COMPOSITE ELECTROLYTE AND LITHIUM BATTERY INCLUDING THE ELECTROLYTE

CROSS REFERENCE TO RELATED APPLICATION

This application claims priority to and the benefit of Korean Patent Application No. 10-2014-0184969, filed on Dec. 19, 2014, in the Korean Intellectual Property Office, the disclosure of which is incorporated herein in its entirety by reference.

BACKGROUND

1. Field

The present disclosure relates to a composite electrolyte and a lithium battery including the composite electrolyte.

2. Description of the Related Art

Carbonaceous materials, such as graphite, are representative examples of anode active materials suitable for use in lithium batteries. Graphite has good capacity retention characteristics and high potential characteristics, and ensures a battery's high stability because there is no volumetric change during intercalation or deintercalation of lithium. Graphite has a low theoretical electric capacity of about 372 milli Ampere hours per gram (mAh/g).

A lithium metal may be used as an anode active material for lithium batteries. A lithium metal may have a very high electrical capacity per unit mass. During intercalation or deintercalation process of lithium ions, a dendrite structure may be formed on a surface of the lithium metal due to a side reaction with an electrolyte, and thus a short circuit may be generated between a cathode and an anode. As a result, lifetime characteristics and charging/discharging efficiency of a lithium battery including a lithium metal may deteriorate.

Therefore, a method of improving lifetime characteristics and charging/discharging efficiency of a lithium battery by suppressing a side reaction between a lithium metal and an electrolyte during charging/discharging of the battery is needed.

SUMMARY

Provided is a composite electrolyte which may suppress a side reaction during charging/discharging of a battery.

Provided is a lithium battery including the composite electrolyte.

Additional aspects will be set forth in part in the description which follows and, in part, will be apparent from the description, or may be learned by practice of the presented exemplary embodiments.

According to an aspect of an exemplary embodiment, a composite electrolyte includes:
 a polymeric ionic liquid; and
 an oligomeric electrolyte,
 wherein the oligomeric electrolyte includes an oligomer.

According to an aspect of another exemplary embodiment, a lithium battery includes:
 a cathode;
 an anode; and
 an electrolyte layer disposed between the cathode and the anode,
 wherein the electrolyte layer includes the composite electrolyte.

BRIEF DESCRIPTION OF THE DRAWINGS

These and/or other aspects will become apparent and more readily appreciated from the following description of the exemplary embodiments, taken in conjunction with the accompanying drawings in which.

DETAILED DESCRIPTION

Figure 1:
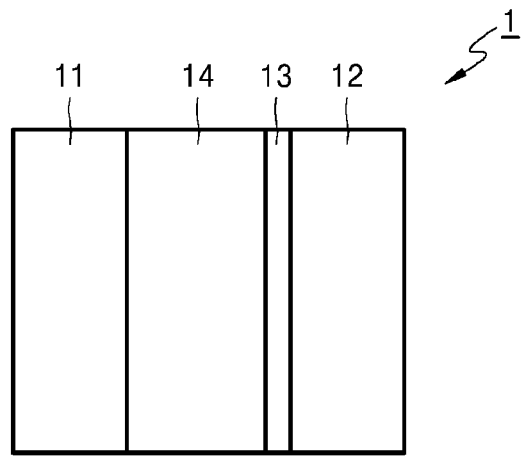
FIG. 1 is a schematic view of a lithium battery according to an embodiment.

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

It will be understood that when an element is referred to as being "on" another element, it can be directly in contact with the other element or intervening elements may be present therebetween. In contrast, when an element is referred to as being "directly on" another element, there are no intervening elements present.

It will be understood that, although the terms first, second, third etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, a first element, component, region, layer, or section discussed below could be termed a second element, component, region, layer, or section without departing from the teachings of the present embodiments.

The terminology used herein is for the purpose of describing particular embodiments only and is not intended to be limiting. As used herein, the singular forms "a," "an," and "the" are intended to include the plural forms as well, unless the context clearly indicates otherwise.

It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, according to exemplary embodiments, a composite electrolyte and a lithium battery including the composite electrolyte will be described in detail.

In all of the chemical formulae disclosed herein, the term "substituted" used with the alkylene group, the alkyl group, the alkoxy group, the alkenyl group, the alkenylene group, the alkynyl group, the alkynylene group, the arylene group, the aryl group, the aryloxy group, the arylalkyl group, the heteroaryl group, the heteroaryloxy group, the heteroarylalkyl group, the heterocyclic group, the heterocyclic alkyl group, the carbocyclic group, or the carbocyclic alkyl group refers to a halogen atom or a C1-C20 alkyl group substituted with a halogen atom (e.g., $CF_3$, $CHF_2$, $CH_2F$, or $CCl_3$), a hydroxyl group, a nitro group, a cyano group, an amino group, an amidino group, a hydrazine group, a hydrazone group, a carboxyl group or a salt thereof, a sulfonic acid group or a salt thereof, a phosphoric acid group or a salt thereof, or a $C_1$-$C_{20}$ alkyl group, a $C_2$-$C_{20}$ alkenyl group, a $C_2$-$C_{20}$ alkynyl group, a $C_1$-$C_{20}$ heteroalkyl group, a $C_6$-$C_{20}$ aryl group, a $C_6$-$C_{20}$ arylalkyl group, a $C_6$-$C_{20}$ heteroaryl group, or a $C_6$-$C_{20}$ heteroarylalkyl group.

The term "alkyl group" as used herein in a chemical formula refers to a monovalent fully saturated branched or unbranched (or straight chain or linear) hydrocarbon group. Examples of the term "alkyl group" used in the chemical formula are methyl, ethyl, propyl, isobutyl, sec-butyl, tert-butyl, neo-butyl, iso-amyl, and hexyl group.

The term "heteroalkyl group" as used herein in a chemical formula refers to an alkyl group as defined above in which at least one carbon atom is replaced with a heteroatom selected from nitrogen (N), oxygen (O), phosphorus (P), or sulfur (S) and having carbon as remaining cyclic atoms. Examples of the term "heteroalkyl group" used in the chemical formula are methylthio, methoxymethyl, and dimethylamino.

The term "alkoxy group" as used herein in a chemical formula refers to alkyl-O—, wherein the alkyl group is as described above. Examples of the term "alkoxy group" used in the chemical formula are methoxy, ethoxy, propoxy group, or the like.

The term "aryl group" as used herein in a chemical formula, which is used alone or in combination, indicates a monovalent aromatic system including at least one ring. Examples of the term "aryl group" used in the chemical formula are phenyl, naphthyl, tetrahydronaphthyl group, and the like.

The term "arylalkyl group" as used herein in a chemical formula refers to an alkyl group substituted with an aryl group. Detailed examples of the term "arylalkyl group" used in the chemical formula are phenylmethyl, phenylethyl, naphthylmethyl, naphthylethyl, tetrahydronaphthylmethyl, tetrahydronaphthylethyl group, and the like.

The term "aryloxy group" as used herein in a chemical formula refers to aryl-O—, wherein the aryl group is as described above. Examples of the term "aryloxy group" used in the chemical formula are phenoxy, naphthyloxy, tetrahydronaphthyloxy group, and the like.

The term "arylthio group" as used herein in a chemical formula refers to aryl-S—, wherein the aryl group is as described above. Examples of the term "arylthio group" used in the chemical formula are phenylthio, naphthylthio, tetrahydronaphthylthio group, and the like.

The term "heteroaryl group" as used in a chemical formula refers to a monovalent group derived from an organic compound having at least one heteroatom selected from N, O, P, and S and having carbon as remaining cyclic atoms. Detailed examples of the term "heteroarylene group" used in the chemical formula are pyridyl group and the like.

The term "heteroarylalkyl group" used in a chemical formula refers to an alkyl group substituted with a heteroaryl group. Detailed examples of the term "heteroarylalkyl group" used in the Formulae above are 2-pyridylmethyl and the like.

The term "heteroarylalkoxy group" as used herein in a chemical formula refers to heteroarylalkyl-O moiety. Detailed examples of the term "heteroarylalkoxy group" used in the chemical formula are 2-pyridylmethyloxy and the like.

The term "heteroaryloxy group" as used in a chemical formula refers to an heteroaryl-O moiety. Detailed examples of the term "heteroaryloxy group" used in the chemical formula are 2-pyridyloxy and the like.

The term "heteroarylthio group" as used in a chemical formula refers to an heteroaryl-S moiety. Detailed examples of the term "heteroarylthio group" used in the chemical formula are 2-pyridylthio and the like.

The term "cycloalkyl group" used in a chemical formula refers to a saturated or partially unsaturated non-aromatic monocyclic, bicyclic, or tricyclic hydrocarbon group.

Detailed examples of the term "carbocyclic group" used in the chemical formula are cyclohexyl and the like.

The term "cycloalkyloxy group" as used in a chemical formula refers to an cycloalkyl-O moiety. Detailed examples of the term "cycloalkyloxy group" used in the chemical formula are cyclohexyloxy and the like.

The term "heterocycloalkyl group" used in a chemical formula refers to a cycloalkyl group as defined above in which at least one carbon atom is replaced with a heteroatom selected from nitrogen (N), oxygen (O), phosphorus (P), or sulfur (S) and having carbon as remaining cyclic atoms. Detailed examples of the term "heterocycloalkyl group" used in the chemical formula are 3-tetrahydrofuranylmethyl and the like.

The term "heterocycloalkyloxy group" as used in a chemical formula refers to an heterocycloalkyl-O moiety. Detailed examples of the term "heterocycloalkyloxy group" used in the chemical formula are 3-tetrahydrofuranylmethyloxy and the like.

The term "alkyleneoxide group" as used in a chemical formula refers to a group $CH_3O(CH_2CH_2O)_n$—, wherein n is a natural number. Detailed examples of the term "alkyleneoxide group" used in the chemical formula are methoxyethoxy and the like.

The term "ionic liquid" or "IL" used herein refers to a salt having a melting point of about 100° C. or lower. The ionic liquid comprises a cation and an anion, and at least one of the cation and the anion may be an organic ion. Furthermore, one selected from the cation and the anion of the ionic liquid may be an inorganic ion or may not be an inorganic ion. The ionic liquid is a chemically stable compound, which has low flammability, negligible vapor pressure, high ionic conductivity, and wide electrochemical window. For example, the ionic liquid may be a liquid at room temperature i.e., a room temperature ionic liquid—RTIL.

The term "polymeric ionic liquid" (or "PIL") as used herein refers to a polymer prepared by polymerizing ionic liquid monomers.

The term "oligomer" as used herein refers to a molecule having a relatively intermediate molecular weight, usually of 500 to 2,000 Daltons, wherein the molecule is derived from monomers having relatively low molecular weight and is formed of 2 to 20 monomer units. The term "molecule having a relatively intermediate molecular weight" as used herein refers to a molecule that has no significant change in physical properties even when one monomer unit or a few monomer units are removed. An oligomer is different from a polymer having 100 or more monomer units. The oligomer may include at least two different monomer units. For example, the oligomer may be formed of 2 to 15 monomer units. For example, the oligomer may be formed of 2 to 10 monomer units.

The term "cathode" as used herein refers to an electrode capable of intercalating electrons while discharging a lithium battery and deintercalating electrons while charging the lithium battery.

The term "anode" as used herein refers to an electrode capable of deintercalating electrons while discharging a lithium battery and intercalating electrons while charging the lithium battery.

The term "cathode active material" as used herein refers to a material that is capable of intercalating lithium while discharging a lithium battery and deintercalating lithium while charging the lithium battery.

The term "anode active material" as used herein refers to a material that is capable of deintercalating lithium while discharging a lithium battery and intercalating lithium while charging the lithium battery.

The term "3 to 31 membered group" as used herein refers to a group having 3 to 31 atoms selected from carbon atoms and heteroatoms other than hydrogen atoms.

A composite electrolyte according to an embodiment includes a polymeric ion liquid; and an oligomeric electrolyte, wherein the oligomeric electrolyte includes an oligomer.

A conventional electrolyte includes an organic solvent and/or an ionic liquid in the electrolyte to provide high ion conductivity. However, the organic solvent and/or the ionic liquid in the electrolyte may easily decompose during charging and discharging a battery, and thus due to this side reaction or the decomposition, dendrites may readily form on a surface of a lithium anode. In this regard, an overvoltage occurs in a lithium battery, and lifespan characteristics and charging/discharging efficiency of the lithium battery may deteriorate.

Whereas, the composite electrolyte according to an embodiment includes the polymeric ionic liquid and the oligomeric electrolyte, and thus may not substantially include an organic solvent and/or an ionic liquid in the composite electrolyte. Accordingly, uniform ion distribution on an electrode/electrolyte interface may be secured, and the electrode/electrolyte interface may be stabilized. Thus, dendrite formation may be suppressed since a side reaction may be suppressed. In this regard, overvoltage of a lithium battery may be suppressed, and an electrode reaction may become reversible.

Also, when the composite electrolyte includes the oligomeric electrolyte, an ion conductivity of the composite electrolyte improves, and thus flexibility of the composite electrolyte may increase as well. As a result, an internal resistance of the lithium battery decreases, and a volume change of a lithium metal electrode may be efficiently accommodated.

In the composite electrolyte, the oligomer may be at least one selected from, but not limited to, a polyether oligomer, a polyvinyl alcohol oligomer, a polyvinyl lactam oligomer, a polysiloxane oligomer, a polyethylene glycol oligomer, and a polypropylene glycol oligomer, and any oligomer available in the art may be used.

The polyether oligomer is an oligomer including an ether repeating unit. Examples of the ether repeating unit may include repeating units derived from an ethylene oxide, a methylene oxide, and a propylene oxide. The polyvinyl alcohol oligomer is an oligomer including a vinyl alcohol repeating unit. An example of the vinyl alcohol repeating unit may be a repeating unit derived from vinyl alcohol. The polyvinyl lactam oligomer is an oligomer including a vinyl lactam repeating unit. An example of the vinyl lactam repeating unit may be a repeating unit derived from vinyl pyrrolidone. An example of the polysiloxane oligomer may be polysiloxane. An example of the polyethylene glycol oligomer may be polyethylene glycol. An example of the polypropylene glycol oligomer may be polypropylene glycol.

For example, the oligomer may be at least one selected from, but not limited to, poly(ethyleneglycol) methacrylate, poly(ethyleneglycol) acrylate, poly(ethyleneglycol) methyl ether methacrylate, poly(ethyleneglycol) phenyl ether acrylate, poly(ethyleneglycol) diacrylate, poly(ethyleneglycol) dimethacrylate, poly(ethyleneglycol) diamine, poly(ethyleneglycol) diglycidyl ether, poly(ethyleneglycol) bis(carboxymethyl) ether, poly(ethyleneglycol) dimethyl ether, poly(ethyleneglycol) dithiol, poly(ethyleneglycol), and poly(ethyleneglycol) methyl ether amine. However, the oligomer is not limited thereto, and any oligomer available in the art may be used.

A molecular weight of the oligomer in the composition may be 1,000 or less. The molecular weight of the oligomer is a molecular weight of a single compound, when the oligomer is a single compound, or a number average molecular weight, when the oligomer is a combination. For example, a molecular weight of the oligomer may be in a range of about 100 to about 1,000. For example, a molecular weight of the oligomer may be in a range of about 100 to about 900. For example, a molecular weight of the oligomer may be in a range of about 100 to about 800. For example, a molecular weight of the oligomer may be in a range of about 100 to about 700. For example, a molecular weight of the oligomer may be in a range of about 100 to about 600. When a molecular weight of the oligomer in the composite electrolyte is within these ranges, a lithium battery including the composite electrolyte may have improved charging/discharging characteristics. While not wishing to be bound by theory, it is understood that when a molecular weight of the oligomer is too high, the oligomer is not substantially an oligomer but a polymer which may result decrease in ion conductivity of the electrolyte, and when a molecular weight of the oligomer is too low, the oligomer may easily decompose during charging/discharging of the lithium battery.

In the composite electrolyte, a melting point of the oligomer may be 40° C. or lower. That is, the oligomer may be liquid at room temperature. For example, a melting point of the oligomer in the composite electrolyte may be in a range of about −40° C. to about 40° C. For example, a melting point of the oligomer in the composite electrolyte may be in a range of about −40° C. to about 35° C. For example, a melting point of the oligomer in the composite electrolyte may be in a range of about −40° C. to about 30° C. For example, a melting point of the oligomer in the composite electrolyte may be in a range of about −40° C. to about 25° C. For example, a melting point of the oligomer in the composite electrolyte may be in a range of about −40° C. to about 20° C. That is, the oligomer may be liquid at room temperature. When a melting point of the oligomer is higher than 20° C., the oligomer is solid at room temperature, and thus ion conductivity of the electrolyte may decrease. As used herein, room temperature is a temperature in a range of about 10° C. to about 30° C.

In the composite electrolyte, the oligomeric electrolyte may include the oligomer and a lithium salt. The lithium salt is not particularly limited, and any lithium salt available in the art may be used. Examples of the lithium salt may include $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_2$, $LiAlCl_4$, $LiN(C_xF_{2x+1}SO_2)(C_yF_{2y+1}SO_2)$ (wherein, x and y are natural numbers), LiCl, LiI, or a combination thereof.

In the oligomeric electrolyte, a concentration of the lithium salt may be in a range of about 0.01 molar (M) to about 2.0 M, but the concentration range is not limited thereto, and any appropriate concentration according to the need may be used. While not wishing to be bound by theory, it is understood that when a concentration of lithium in the oligomeric electrolyte is within this range, battery characteristics of a lithium battery including the organic electrolyte may further improve.

In the composite electrolyte, an amount of the oligomeric electrolyte may be in a range of about 10 parts to about 500 parts by weight based on 100 parts by weight of the polymeric ionic liquid. For example, an amount of the oligomeric electrolyte may be in a range of about 20 parts to about 400 parts by weight based on 100 parts by weight of the polymeric ionic liquid. For example, an amount of the oligomeric electrolyte may be in a range of about 30 parts to about 300 parts by weight based on 100 parts by weight of the polymeric ionic liquid. For example, an amount of the oligomeric electrolyte may be in a range of about 40 parts to about 200 parts by weight based on 100 parts by weight of the polymeric ionic liquid. For example, an amount of the oligomeric electrolyte may be in a range of about 50 parts to about 150 parts by weight based on 100 parts by weight of the polymeric ionic liquid. While not wishing to be bound by theory, it is understood that when the composite electrolyte has a composition of an amount of the oligomeric electrolyte and an amount of the polymeric ionic liquid within these ranges, charging/discharging characteristics of a lithium battery including the composite electrolyte may further improve.

The composite electrolyte may be a non-self-standing film. For example, when an amount of the oligomer in the composite electrolyte is high, a non-self-standing film may be formed. The non-self-standing film forms a flexible film and thus may easily accommodate a volume change of the anode and may not be easily cracked. The non-self-standing film may form a film or a layer that is disposed on a substrate or a support. Therefore, the composite electrolyte may differ from a conventional inorganic electrolyte and/or a composite electrolyte that has no flexibility and forms a self-standing film, which may be easily cracked. A method of disposing the non-self-standing film on a substrate or a support is not particularly limited, and the method may include coating and drying a solution including the composite electrolyte or UV-ray curing by using a binder of a composite electrolyte precursor including a monomer.

Alternatively, the composite electrolyte may form a self-standing film. For example, when an amount of the oligomer in the composite electrolyte is low, a self-standing film may be formed. The composite electrolyte that forms the self-standing film may have improved mechanical strength.

In the composite electrolyte, the polymeric ionic liquid may be at least one selected from a cationic polymeric ionic liquid, an anionic polymeric ionic liquid, and a zwitterionic polymeric ionic liquid.

The cationic polymeric liquid includes a cation in its backbone, and a counter ion of the cationic polymeric liquid is an anion. For example, the cationic polymeric liquid may have a structure selected from structures 1 to 33:

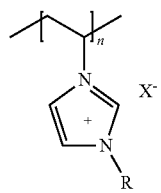

1

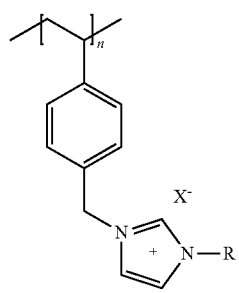

2

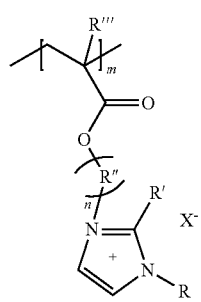

3

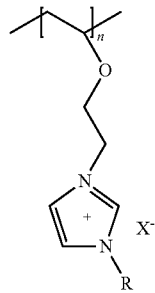

4

-continued

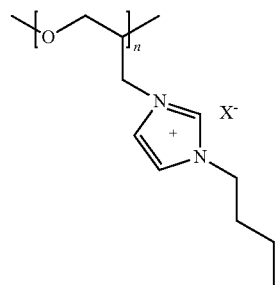

5

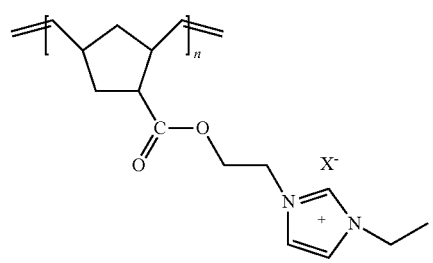

6

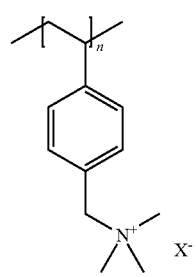

7

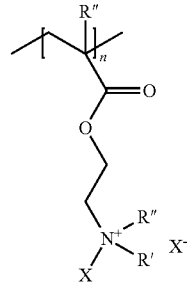

8

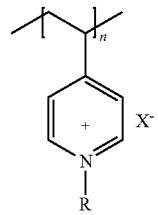

9

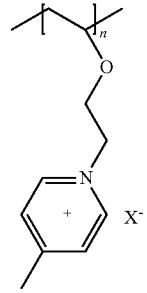

10

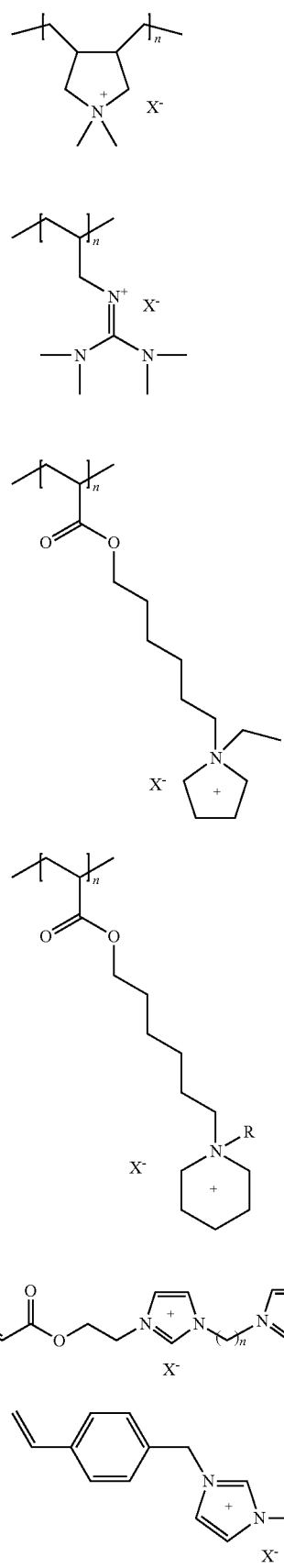
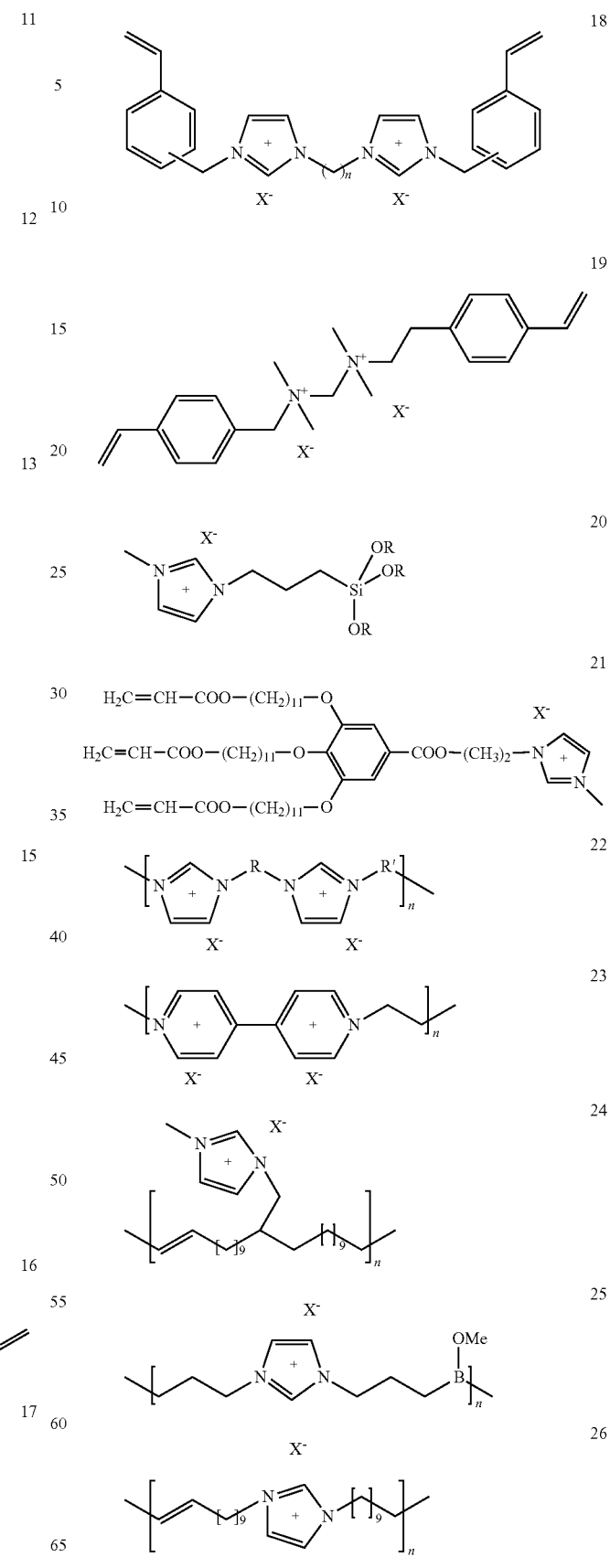

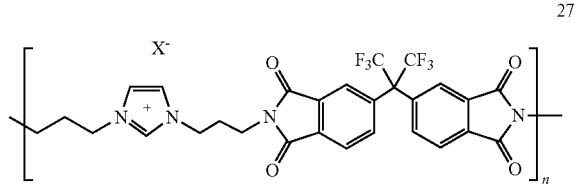
27
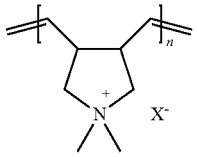
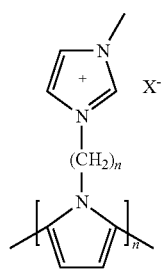
28
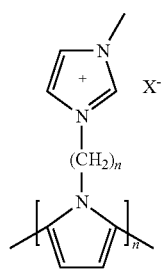
29
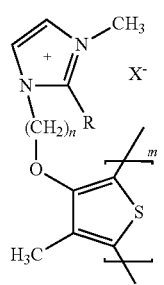
30
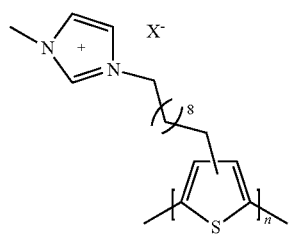
31
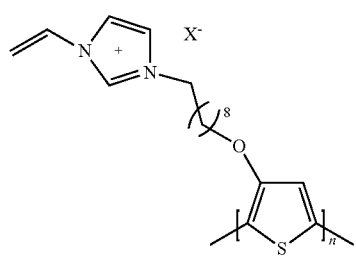
32
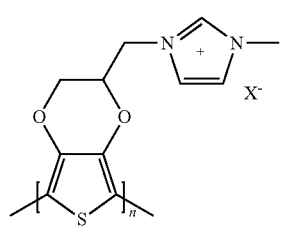
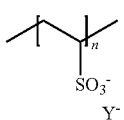
33
R = H, or alkyl
X = BF$_4$, PF$_6$, TFSI, CF$_3$SO$_3$, SCN, etc
The anionic polymeric liquid includes an anion in its backbone, and a counter ion of the anionic polymeric liquid is a cation. For example, the anionic polymeric liquid may have a structure selected from structures 34 to 41:
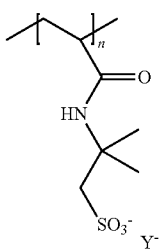
34
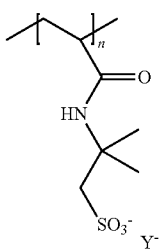
35
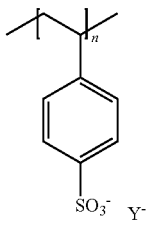
36
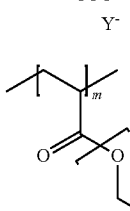
37
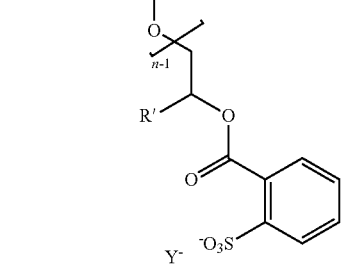
38

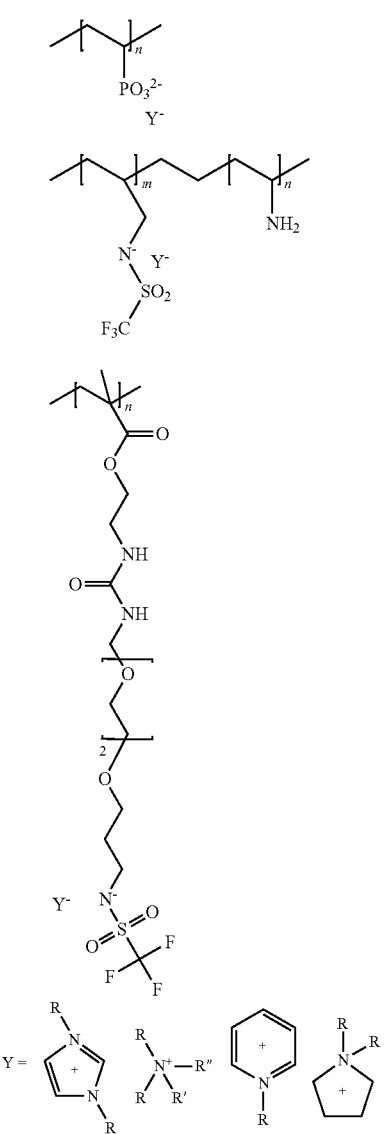

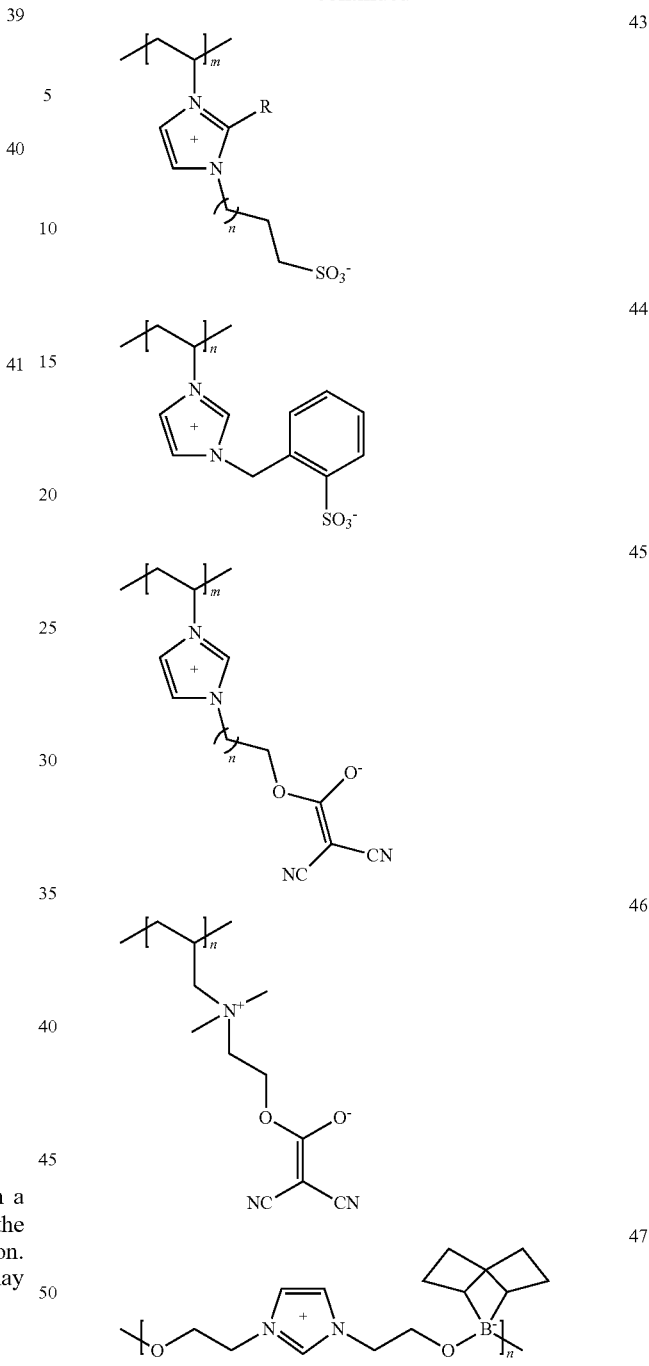

The zwitterionic polymeric ionic liquid includes both a cation and an anion in its backbone, and a counter ion of the zwitterionic polymeric ionic liquid a cation and/or an anion. For example, the zwitterionic polymeric ionic liquid may have a structure selected from structures 42 to 47:

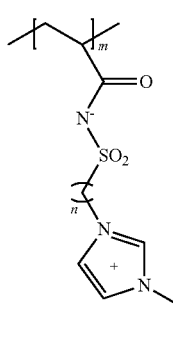

For example, the polymeric ionic liquid in the composite electrolyte may be represented by Formula 1a and Formula 1b:

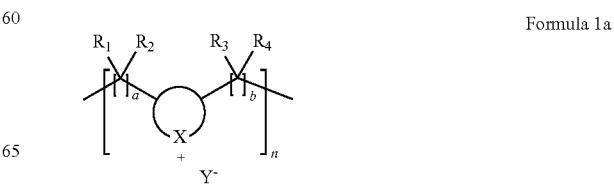

-continued

Formula 1b

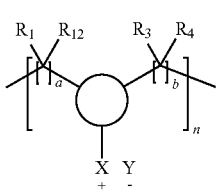

In Formula 1,

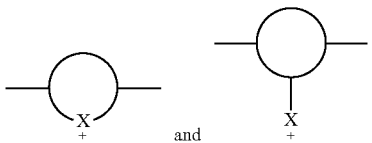

are each independently a 3 to 31 membered group comprising 2 to 30 carbon atoms and optionally at least one heteroatom in addition to X, wherein the 3 to 31 membered group may include an unsubstituted or substituted $C_3$-$C_{30}$ cycloalkyl ring, an unsubstituted or substituted $C_6$-$C_{30}$ aryl ring, or an unsubstituted or substituted $C_2$-$C_{30}$ heteroaryl ring;

X is S, —N($R_5$)($R_6$), —N($R_5$), —P($R_5$), or —P($R_5$)($R_6$);

$R_1$ to $R_6$ are each independently a hydrogen, an unsubstituted or substituted $C_1$-$C_{30}$ alkyl group, an unsubstituted or substituted $C_1$-$C_{30}$ heteroalkyl group, an unsubstituted or substituted $C_1$-$C_{30}$ alkoxy group, an unsubstituted or substituted $C_6$-$C_{30}$ aryl group, an unsubstituted or substituted $C_7$-$C_{30}$ arylalkyl group, an unsubstituted or substituted $C_6$-$C_{30}$ aryloxy group, an unsubstituted or substituted $C_6$-$C_{30}$ arylthio group, an unsubstituted or substituted $C_3$-$C_{30}$ heteroaryl group, an unsubstituted or substituted $C_4$-$C_{30}$ heteroarylalkyl group, an unsubstituted or substituted $C_3$-$C_{30}$ heteroaryloxy group, an unsubstituted or substituted $C_3$-$C_{30}$ heteroarylthio group, an unsubstituted or substituted $C_3$-$C_{30}$ cycloalkyl group, an unsubstituted or substituted $C_3$-$C_{30}$ heterocycloalkyl group, an unsubstituted or substituted $C_3$-$C_{30}$ cycloalkyloxy group, or an unsubstituted or substituted $C_2$-$C_{100}$ alkyleneoxide group;

$Y^-$ is an anion;

a and b are each independently an integer of 1 to 5; and n is an integer of 500 to 2,800.

In the composite electrolyte,

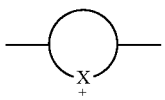

in Formula 1 may be represented by Formula 2:

Formula 2

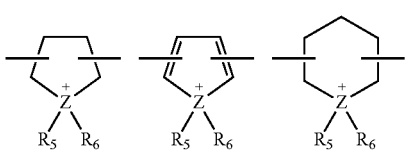

-continued

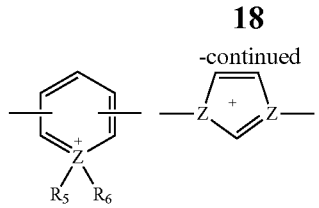

In Formula 2,

Z denotes N, S, or P; and $R_5$ and $R_6$ are each independently a hydrogen, a $C_1$-$C_{30}$ alkyl group, a $C_1$-$C_{30}$ alkoxy group, a $C_6$-$C_{30}$ aryl group, a $C_6$-$C_{30}$ aryloxy group, a $C_3$-$C_{30}$ heteroaryl group, a $C_3$-$C_{30}$ heteroaryloxy group, a $C_3$-$C_{30}$ cycloalkyl group, a $C_3$-$C_{30}$ heterocycloalkyl group, or a $C_2$-$C_{100}$ alkyleneoxide group.

When Z denotes S, $R_5$ and $R_6$ are absent.

For example, in the composite electrolyte, the polymeric ionic liquid represented by Formula 1 may be a polymeric ionic liquid represented by Formula 3:

Formula 3

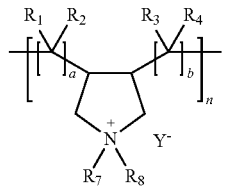

In Formula 3, $R_1$ to $R_8$ are each independently a hydrogen, an unsubstituted or substituted $C_1$-$C_{30}$ alkyl group, an unsubstituted or substituted $C_1$-$C_{30}$ alkoxy group, an unsubstituted or substituted $C_6$-$C_{30}$ aryl group, an unsubstituted or substituted $C_6$-$C_{30}$ aryloxy group, an unsubstituted or substituted $C_3$-$C_{30}$ heteroaryl group, an unsubstituted or substituted $C_3$-$C_{30}$ heteroaryloxy group, an unsubstituted or substituted $C_3$-$C_{30}$ cycloalkyl group, an unsubstituted or substituted $C_3$-$C_{30}$ heterocycloalkyl group, or an unsubstituted or substituted $C_2$-$C_{100}$ alkyleneoxide group;

$Y^-$ is at least one selected from $BF_4^-$, $PF_6^-$, $AsF_6^-$, $SbF_6^-$, $AlCl_4^-$, $HSO_4^-$, $ClO_4^-$, $CH_3SO_3^-$, $CF_3CO_2^-$, $(CF_3SO_2)_2N^-$, $Cl^-$, $Br^-$, $I^-$, $BF_4^-$, $SO_4^-$, $PF_6^-$, $ClO_4^-$, $CF_3SC_3^-$, $CF_3CO_2^-$, $(C_2F_5SO_2)_2N^-$, $(C_2F_5SO_2)(CF_3SO_2)N^-$, and $(CF_3SO_2)_2N^-$;

a and b are each independently an integer of 1 to 5; and n is an integer of 500 to 2,800.

For example, the polymeric ionic liquid may be poly(diallyldimethylammonium)trifluoromethanesulfonylimide (poly(diallyldimethylammonium)TFSi).

The composite electrolyte may further include a plurality of inorganic particles. When the composite electrolyte further includes the inorganic particles, ion conductivity and mechanical strength of the composite electrolyte may improve.

The inorganic particles may include at least one selected from a metal oxide, a metal hydroxide, a metal carbonate, a metal carboxylate, a metal silicate, a metal aluminosilicate, a metal carbide, a metal nitride, a carbon oxide, a carbonaceous material, and an organic-inorganic composite. But the inorganic particles are not limited thereto, and any inorganic particles that may improve ion conductivity and mechanical strength of the electrolyte may be used. For example, the inorganic particles may be at least one selected from $Al_2O_3$, $SiO_2$, $BaTiO_3$, $TiO_2$, $MnO_2$, $Mn_2O_3$, $SnO_2$, graphite oxide, graphene oxide, metal organic frameworks (MOF), and polyhedral oligomeric silsesquioxanes (POSS).

A particle diameter of the inorganic particles may be less than 100 nanometers (nm). For example, a particle diameter of the inorganic particles may be in a range of about 1 nm to about 100 nm. For example, a particle diameter of the inorganic particles may be in a range of about 5 nm to about 100 nm. For example, a particle diameter of the inorganic particles may be in a range of about 10 nm to about 70 nm. For example, a particle diameter of the inorganic particles may be in a range of about 30 nm to about 70 nm.

In the composite electrolyte, an amount of the inorganic particles may be in a range of about 0.1 percent by weight (wt %) to about 95 wt % based on the total weight of the composite electrolyte. For example, an amount of the inorganic particles may be in a range of about 1 wt % to about 90 wt % based on the total weight of the composite electrolyte. For example, an amount of the inorganic particles may be in a range of about 1 wt % to about 60 wt % based on the total weight of the composite electrolyte. For example, an amount of the inorganic particles may be in a range of about 1 wt % to about 30 wt % based on the total weight of the composite electrolyte. While not wishing to be bound by theory, it is understood that when an amount of the inorganic particles is too high, migration of lithium ions in a protecting layer may be difficult, and thus a battery resistance may increase.

The inorganic particles may be porous. For example, the inorganic particles may be mesoporous particles. Examples of the inorganic particles may include, as stated above, particular inorganic particles such as $Al_2O_3$ and $SiO_2$ in a porous form.

According to another embodiment, a lithium battery includes:
 a cathode;
 an anode; and
 an electrolyte layer that is disposed between the cathode and the anode,
 wherein the electrolyte layer includes the composite electrolyte.

Since the lithium battery includes the electrolyte layer including composite electrolyte, a side reaction on a surface of the anode is suppressed, and thus lifespan characteristics and charging/discharging efficiency of the lithium battery may improve.

In the lithium battery, a thickness of the electrolyte layer including the composite electrolyte may be in a range of about 100 nm to about 100 micrometers (μm). For example, in the lithium battery, a thickness of the electrolyte layer including the composite electrolyte may be in a range of about 0.5 μm to about 50 μm. For example, in the lithium battery, a thickness of the electrolyte layer including the composite electrolyte may be in a range of about 0.5 μm to about 40 μm. For example, in the lithium battery, a thickness of the electrolyte layer including the composite electrolyte may be in a range of about 1 μm to about 30 μm. For example, in the lithium battery, a thickness of the electrolyte layer including the composite electrolyte may be in a range of about 1 μm to about 20 μm. For example, in the lithium battery, a thickness of the electrolyte layer including the composite electrolyte may be in a range of about 1 μm to about 10 μm. For example, in the lithium battery, a thickness of the electrolyte layer including the composite electrolyte may be in a range of about 1 μm to about 5 μm. When a thickness of the electrolyte layer is too high, an interface resistance may increase, and when a thickness of the electrolyte is too low, an effect obtained by an introduction of the electrolyte layer may be insignificant.

In the lithium battery, the composite electrolyte may be located adjacent to and in contact with the anode. For example, as shown in FIG. 1, a lithium battery 1 may include a cathode 11; an anode 12; and an electrolyte layer 13 that is disposed adjacent to an in contact with the anode 12. An interlayer 14 may be disposed between the cathode 11 and the electrolyte layer 13. The interlayer 14 may be an electrolyte layer or a separator that has a composition different from that of the electrolyte layer 13. That is, the electrolyte layer 13 including the composite electrolyte may be disposed on the anode 12.

In the lithium battery, since the electrolyte layer including the composite electrolyte is disposed on at least a part of the anode, a surface of the anode may be electrochemically stabilized. Thus, during charging/discharging of the lithium battery, formation of dendrites on the surface of the anode may be suppressed, stability of an interface between the anode and the composite electrolyte improves, and current may be evenly distributed on the surface of the anode. As a result, cycle characteristics of the lithium battery may improve. Further, the electrolyte layer may serve as a protecting layer that protects the surface of the anode. For example, since the surface of the anode is completely covered by the electrolyte layer, a direct contact of the surface of the anode with other electrolyte, which is disposed between the electrolyte layer including the composite electrolyte and the cathode and has a composition different from that of the composite electrolyte (i.e., has a high reactivity with the surface of the anode), may be prevented. As a result, the anode may be protected, and thus stability of the anode may improve.

In the lithium battery, at least a part of the anode may be coated with the electrolyte layer including the composite electrolyte. That is, the electrolyte layer is not simply physically stacked on the anode. Instead, since the electrolyte layer is formed by the coating, the surface of the anode and the electrolyte layer may evenly and tightly contact each other. For example, the electrolyte layer and the anode may be integrated into one body. A method of the coating is not particularly limited, and any coating method available in the art such as bar coating or spin coating may be used to perform coating of the electrolyte layer on the anode. For example, the surface of the anode may be first coated with a composition including the composite electrolyte and then dried at room temperature to form the electrolyte layer. Alternatively, the surface of the anode may be coated with a precursor solution of the composite electrolyte, the coated surface may be exposed to UV rays to perform a binding reaction, and thus a composite electrolyte layer may be formed.

For example, the anode in the lithium battery may include a lithium metal. Also, the anode may further include an alloy of lithium and other metal. The other metal may be Si or Sn, but it is not limited thereto, and any metal that may form an alloy with lithium may be used.

In the lithium battery, a thickness of the lithium metal may be less than 100 μm. For example, cycle characteristics of the lithium battery may be stable even though a lithium thin layer has a thickness of only less than 100 μm. For example, in the lithium battery, a thickness of the lithium metal may be 80 μm or less. For example, in the lithium battery, a thickness of the lithium metal may be 60 μm or less. For example, in the lithium battery, a thickness of the lithium metal may be 50 μm or less. In a conventional lithium battery, when a thickness of a lithium thin layer is less than 100 μm, lithium deteriorates by side reactions and formation of dendrites, and thus the lithium battery would not provide stable cycle characteristics.

Figure 2:
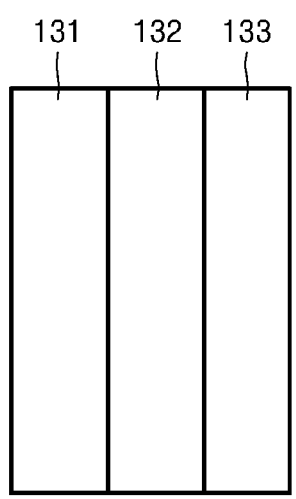
FIG. 2 is a schematic view of a multi-layer structure electrolyte layer according to an embodiment.

In the lithium battery, the electrolyte layer may have a multi-layer structure including two or more layers. For example, as shown in FIG. 2, the electrolyte layer 13 shown in FIG. 1 may have a multi-layer structure including a first layer 131, a second layer 132, and a third layer 133.

Further, the two or more layers may have different compositions. For example, in FIG. 2, the first layer 131, the second layer 132, and the third layer 133 may have different compositions from each other. For example, the two or more layers may each independently include at least one selected from a liquid electrolyte, a gel electrolyte, and a solid electrolyte. For example, in the multi-layer structure, the third layer 133 shown in FIG. 2 adjacent to and in contact with the anode 12 shown in FIG. 1 may include the composite electrolyte, the second layer 132 may include a liquid electrolyte, and the first layer 131 may include a solid electrolyte.

Figure 3:
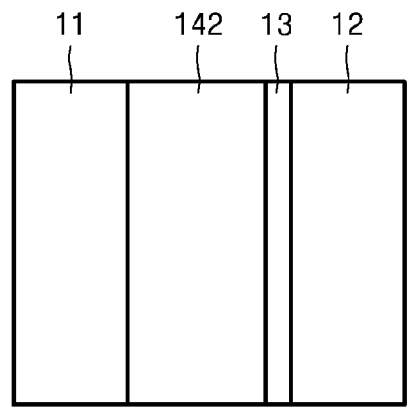
FIG. 3 is a schematic view of a lithium battery according to another embodiment.

The lithium battery may further include a liquid electrolyte adjacent to and in contact with the cathode. As shown in FIG. 3, a lithium battery may include a cathode 11; an anode 12; an electrolyte layer 13 including the composite electrolyte disposed on the anode 12; and a liquid electrolyte 142 disposed between the cathode 11 and the electrolyte layer 13.

In the lithium battery, the liquid electrolyte 142 may include an ionic liquid. For example, the liquid electrolyte 142 may include a lithium salt and at least one selected from an organic solvent and an ionic liquid. A molecular weight and a viscosity of the organic solvent and the ionic liquid are lower than those of the oligomer. The liquid electrolyte may be an organic electrolyte. Therefore, the liquid electrolyte may not substantially include water.

The organic solvent may be an ether solvent and a carbonate solvent, but it is not limited thereto, and any organic solvent available in the art that may be used as a solvent of a liquid electrolyte and stable with respect to a lithium metal may be used.

For example, the organic solvent may be at least one selected from propylene carbonate, ethylene carbonate, fluoroethylene carbonate, vinylethylene carbonate, butylene carbonate, dimethyl carbonate, diethyl carbonate, methyl ethyl carbonate, methyl propyl carbonate, ethyl propyl carbonate, methyl isopropyl carbonate, dipropyl carbonate, dibutyl carbonate, benzonitrile, acetonitrile, tetrahydrofuran, 2-methyltetrahydrofuran, γ-butyrolactone, dioxolane, 4-methyldioxolane, dimethylacetamide, dimethylsulfoxide, 1,4-dioxane, 1,2-dimethoxyethane, diethyl glycol dimethyl ether, sulfolane, dichloroethane, chlorobenzene, nitrobenzene, diethylene glycol, succinonitrile, and dimethyl ether, but it is not limited thereto, and any organic solvent available in the art that is stable with respect to a lithium metal may be used.

For example, the ionic liquid may be represented by Formula 4 or Formula 5:

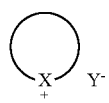

Formula 4

In Formula 4,

is a 3 to 31 membered group comprising 2 to 30 carbon atoms and optionally at least one heteroatom in addition to X, wherein the 3 to 31 membered group may include an unsubstituted or substituted $C_3$-$C_{30}$ cycloalkyl ring, an unsubstituted or substituted $C_6$-$C_{30}$ aryl ring, or an unsubstituted or substituted $C_2$-$C_{30}$ heteroaryl ring;

X in Formula 4 is the same as or different from X in Formulae 1a or 1b and is independently S, —N($R_5$)($R_6$), —N($R_5$), —P($R_5$), or —P($R_5$)($R_6$); and $Y^-$ in Formula 4 is an anion, which is the same as or different from $Y^-$ in Formula 1.

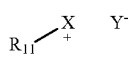

Formula 5

In Formula 5,

X in Formula 5 is the same as or different from X in Formulae 1 and 4 and is independently —N($R_5$)($R_6$), —N($R_5$), —P($R_5$), or —P($R_5$)($R_6$);

$R_{11}$ is an unsubstituted or substituted $C_1$-$C_{30}$ alkyl group, an unsubstituted or substituted $C_1$-$C_{30}$ heteroalkyl group, an unsubstituted or substituted $C_1$-$C_{30}$ alkoxy group, an unsubstituted or substituted $C_6$-$C_{30}$ aryl group, an unsubstituted or substituted $C_7$-$C_{30}$ arylalkyl group, an unsubstituted or substituted $C_6$-$C_{30}$ aryloxy group, an unsubstituted or substituted $C_6$-$C_{30}$ arylthio group, an unsubstituted or substituted $C_3$-$C_{30}$ heteroaryl group, an unsubstituted or substituted $C_4$-$C_{30}$ heteroarylalkyl group, an unsubstituted or substituted $C_3$-$C_{30}$ heteroaryloxy group, an unsubstituted or substituted $C_3$-$C_{30}$ heteroarylthio group, an unsubstituted or substituted $C_3$-$C_{30}$ cycloalkyl group, an unsubstituted or substituted $C_3$-$C_{30}$ cycloalkyloxy group, an unsubstituted or substituted $C_3$-$C_{30}$ heterocycloalkyl group, or an unsubstituted or substituted $C_2$-$C_{100}$ alkyleneoxide group;

$R_4$ and $R_5$ in Formulae 4 and 5 are the same as or different and are each independently a hydrogen, an unsubstituted or substituted $C_1$-$C_{30}$ alkyl group, an unsubstituted or substituted $C_1$-$C_{30}$ heteroalkyl group, an unsubstituted or substituted $C_1$-$C_{30}$ alkoxy group, an unsubstituted or substituted $C_6$-$C_{30}$ aryl group, an unsubstituted or substituted $C_7$-$C_{30}$ arylalkyl group, an unsubstituted or substituted $C_6$-$C_{30}$ aryloxy group, an unsubstituted or substituted $C_6$-$C_{30}$ arylthio group, an unsubstituted or substituted $C_3$-$C_{30}$ heteroaryl group, an unsubstituted or substituted $C_4$-$C_{30}$ heteroarylalkyl group, an unsubstituted or substituted $C_3$-$C_{30}$ heteroaryloxy group, an unsubstituted or substituted $C_3$-$C_{30}$ heteroarylthio group, an unsubstituted or substituted $C_3$-$C_{30}$ cycloalkyl group, an unsubstituted or substituted $C_3$-$C_{30}$ heterocycloalkyl group, an unsubstituted or substituted $C_3$-$C_{30}$ cycloalkyloxy group, or an unsubstituted or substituted $C_2$-$C_{100}$ alkyleneoxide group; and $Y^-$ in Formula 5 is an anion, which is the same as or different from $Y^-$ in Formulae 1 and 4.

For example,

in Formula 4 may be a cation that is represented by Formula 6, and

in Formula 5 may be a cation that is represented by Formula 7:

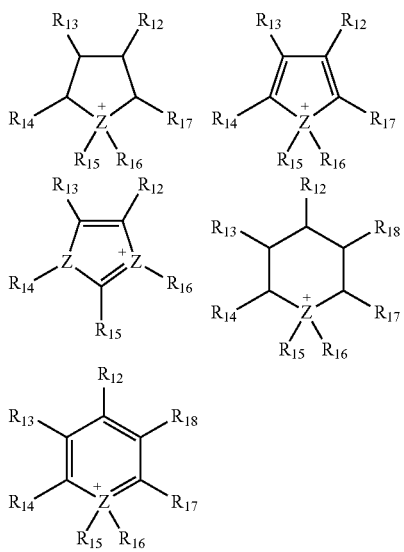

Formula 6

In Formula 6,

Z denotes S, N or P; and $R_{12}$ to $R_{18}$ are each independently a hydrogen, an unsubstituted or substituted $C_1$-$C_{30}$ alkyl group, an unsubstituted or substituted $C_1$-$C_{30}$ alkoxy group, an unsubstituted or substituted $C_6$-$C_{30}$ aryl group, an unsubstituted or substituted $C_6$-$C_{30}$ aryloxy group, an unsubstituted or substituted $C_3$-$C_{30}$ heteroaryl group, an unsubstituted or substituted $C_3$-$C_{30}$ heteroaryloxy group, an unsubstituted or substituted $C_3$-$C_{30}$ cycloalkyl group, an unsubstituted or substituted $C_3$-$C_{30}$ heterocycloalkyl group, or an unsubstituted or substituted $C_2$-$C_{100}$ alkyleneoxide group, provided that when Z denotes S, $R_5$ and $R_6$ are absent.

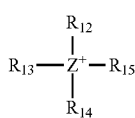

Formula 7

In Formula 7,

Z denotes N or P; and $R_{12}$ to $R_{15}$ are each independently a hydrogen, an unsubstituted or substituted $C_1$-$C_{30}$ alkyl group, an unsubstituted or substituted $C_1$-$C_{30}$ alkoxy group, an unsubstituted or substituted $C_6$-$C_{30}$ aryl group, an unsubstituted or substituted $C_6$-$C_{30}$ aryloxy group, an unsubstituted or substituted $C_3$-$C_{30}$ heteroaryl group, an unsubstituted or substituted $C_3$-$C_{30}$ heteroaryloxy group, an unsubstituted or substituted $C_3$-$C_{30}$ cycloalkyl group, an unsubstituted or substituted $C_3$-$C_{30}$ heterocycloalkyl group, or an unsubstituted or substituted $C_2$-$C_{100}$ alkyleneoxide group.

For example, the ionic liquid may include at least one selected from an ammonium cation, an imidazolium cation, a piperidinium cation, a pyrrolidinium cation, a phosphonium cation, and a sulfonium cation as a cation; and at least one selected from a bis(trifluoromethylsulfonyl)imide anion, a bromide anion, a chloride anion, a dicyanamide anion, a hexafluorophosphate anion, a phosphate anion, a sulfate anion, an iodide anion, a sulfonate anion, a nitrate anion, a tetrafluoroborate anion, a thiocyanate anion, and a triflate anion as an anion.

For example, the ionic liquid may be [emim]Cl/AlCl$_3$ (emim=ethyl methyl imidazolium), [bmpyr]NTf$_2$ (bmpyr=butyl methyl pyridinium), [bpy]Br/AlCl$_3$ (bpy=4, 4'-bipyridine), [choline]Cl/CrCl$_3$.6H$_2$O, [Hpy(CH$_2$)$_3$pyH][NTf$_2$]$_2$ (NTf=trifluoromethanesulfonimide), [emim]OTf/[hmim]I (hmim=hexyl methyl imidazolium), [choline]Cl/HOCH$_2$CH$_2$OH, [Et$_2$MeN(CH$_2$CH$_2$OMe)]BF$_4$ (Et=ethyl, Me=methyl, Pr=propyl, Bu=butyl, Ph=phenyl, Oct=octyl, Hex=hexyl), [Bu$_3$PCH$_2$CH$_2$C$_8$F$_{17}$]OTf (OTf=trifluoromethane sulfonate), [bmim]PF$_6$ (bmim=butyl methyl imidazolium), [bmim]BF$_4$, [omim]PF$_6$ (omim=octyl methyl imidazolium), [Oct$_3$PC$_{18}$H$_{37}$]I, [NC(CH$_2$)$_3$mim]NTf$_2$ (mim=methyl imidazolium), [Pr$_4$N][B(CN)$_4$], [bmim]NTf$_2$, [bmim]Cl, [bmim][Me(OCH$_2$CH$_2$)$_2$OSO$_3$], [PhCH$_2$mim]OTf, [Me$_3$NCH(Me)CH(OH)Ph] NTf$_2$, [pmim][(HO)$_2$PO$_2$](pmim=propyl methyl imidazolium), [b(6-Me)quin]NTf$_2$ (bquin=butyl quinolinium, [bmim][Cu$_2$Cl$_3$], [C$_{18}$H$_{37}$OCH$_2$mim]BF$_4$ (mim=methyl imidazolium), [heim]PF$_6$ (heim=hexyl ethyl imidazolium), [mim(CH$_2$CH$_2$O)$_2$CH$_2$CH$_2$mim][NTf$_2$]$_2$ (mim=methyl imidazolium), [obim]PF$_6$ (obim=octyl butyl imidazolium), [oquin]NTf$_2$ (oquin=octyl quinolinium), [hmim][PF$_3$(C$_2$F$_5$)$_3$], [C$_{14}$H$_{29}$mim]Br (mim=methyl imidazolium), [Me$_2$N(C$_{12}$H$_{25}$)$_2$]NO$_3$, [emim]BF$_4$, [mm(3-NO$_2$)im][dinitrotriazolate], [MeN(CH$_2$CH$_2$OH)$_3$], [MeOSO$_3$], [Hex$_3$PC$_{14}$H$_{29}$]NTf$_2$, [emim][EtOSO$_3$], [choline][ibuprofenate], [emim]NTf$_2$, [emim][(EtO)$_2$PO$_2$], [emim]Cl/CrCl$_2$, or [Hex$_3$PC$_{14}$H$_{29}$]N(CN)$_2$, but it is not limited thereto, and any ionic liquid available in the art may be used.

The liquid electrolyte may include a medium including an organic solvent and/or an ionic liquid, and optionally a lithium salt. The lithium salt is not particularly limited, and any lithium salt available in the art as a lithium salt of a liquid electrolyte may be used. For example, the lithium salt may be LiPF$_6$, LiBF$_4$, LiSbF$_6$, LiAsF$_6$, LiClO$_4$, LiCF$_3$SO$_3$, Li(CF$_3$SO$_2$)$_2$N, LiC$_4$F$_9$SO$_3$, LiAlO$_2$, LiAlCl$_4$, LiN(C$_x$F$_{2x+1}$SO$_2$)(C$_y$F$_{2y+1}$SO$_2$) (wherein, x and y are natural numbers), LiCl, LiI, or a combination thereof. For example, the lithium salt may be LiPF$_6$.

In the liquid electrolyte, a concentration of lithium may be in a range of about 0.01 M to about 2.0 M, but the concentration range is not limited thereto, and any appropriate concentration according to the need may be used. When a concentration of lithium in the liquid electrolyte is within this range, battery characteristics of a battery including the liquid electrolyte may further improve.

Figure 4:
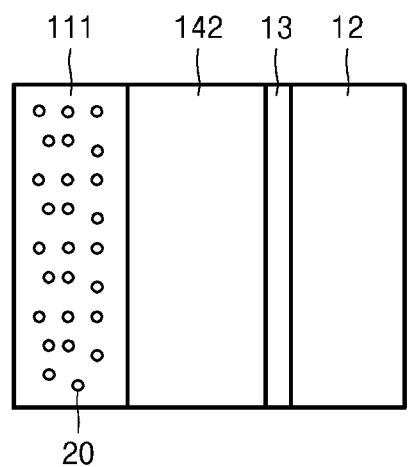
FIG. 4 is a schematic view of a lithium battery according to another embodiment.

In the lithium battery, the cathode may be a porous cathode that impregnated with a liquid electrolyte. As shown in FIG. 4, a lithium battery may include a porous cathode 111; an anode 12; an electrolyte layer 13 including the composite electrolyte disposed on the anode 12; and a liquid electrolyte 142 disposed between the cathode 11 and the electrolyte layer 13. As used herein, examples of the porous cathode 111 may include a cathode in which a liquid electrolyte may penetrate thereto by capillary phenomenon when formation of pores is not intentionally prevented, as well as a cathode having pores that are intentionally formed therein. That is, examples of the porous cathode 111 may include a cathode having pores that are formed during a preparation process. For example, the porous cathode 111 may include a cathode obtained by coating a cathode active material composition including a cathode active material, a conducting material, a binder, and a solvent on a current collector and drying the composition. The porous cathode 111 obtained from the cathode active material composition may include pores existing between particles of the cathode active material. The porous cathode 111 may be impregnated with the liquid electrolyte 142. As the porous cathode 111 is impregnated with the liquid electrolyte 142, contact between the cathode active material and an electrolyte solution increases, and thus an internal resistance of the lithium battery may decrease.

In the lithium battery, the cathode may include at least one selected from a liquid electrolyte, a gel electrolyte, and a solid electrolyte. In order to improve a lithium ion conductivity, the cathode may include a liquid electrolyte, a gel electrolyte, or a solid electrolyte. The liquid electrolyte, gel electrolyte, and solid electrolyte may be any material that is available as an electrolyte of a lithium battery in the art as long as the material does not react with the cathode active material during charging/discharging process and deteriorates the cathode active material. The liquid electrolyte may be identical to a liquid electrolyte with which the porous cathode 111 shown in FIG. 4 is impregnated. The gel electrolyte may be a polymer gel electrolyte. The solid electrolyte may be a solid polymer electrolyte or a solid inorganic ion conductor. For example, the solid electrolyte may be identical to a solid electrolyte which is used in a solid electrolyte layer shown in FIG. 5.

Figure 5:
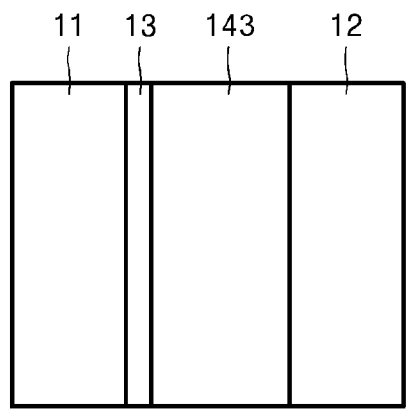
FIG. 5 is a schematic view of a lithium battery according to another embodiment.

The lithium battery may include a cathode; an anode; and a composite electrolyte layer adjacent to and in contact with the cathode, and may include a solid electrolyte layer disposed on at least a part of the anode. As shown in FIG. 5, a lithium battery may include a cathode 11, an anode 12, a composite electrolyte layer 13 adjacent to and in contact with the cathode 11, and an interlayer 143 disposed between the composite electrolyte layer 13 and the anode 12. The interlayer 143 may be an electrolyte layer or a separator that has a composition different from that of the electrolyte layer 13. For example, the interlayer 143 may include a solid electrolyte layer. The solid electrolyte layer may include at least one selected from an ionically conducting polymer, a polymeric ionic liquid (PIL), and an inorganic electrolyte, but it is not limited thereto, and any solid electrolyte available in the art may be used.

For example, the interlayer 143 may include at least one selected from a polyethyleneoxide (PEO), a solid graft copolymer including two or more polymer blocks having a low Tg, poly(diallyldimethylammonium)trifluoromethanesulfonylimide (poly(diallyldimethylammonium)TFSi), $Cu_3N$, $Li_3N$, LiPON, $Li_3PO_4 \cdot Li_2S \cdot SiS_2$, $Li_2S \cdot GeS_2 \cdot Ga_2S_3$, $Li_2O \cdot 11Al_2O_3$, $Na_2O \cdot 11Al_2O_3$, $(Na,Li)_{1+x}Ti_{2-x}Al_x(PO_4)_3$ (wherein 0.1≤x≤0.9), $Li_{1+x}Hf_{2-x}Al_x(PO_4)_3$ (wherein 0.1≤x≤0.9), $Na_3Zr_2Si_2PO_{12}$, $Li_3Zr_2Si_2PO_{12}$, $Na_5ZrP_3O_{12}$, $Na_5TiP_3O_{12}$, $Na_3Fe_2P_3O_{12}$, $Na_4NbP_3O_{12}$, a Na-Silicate, $Li_{0.3}La_{0.5}TiO_3$, $Na_5MSi_4O_{12}$ (wherein, M is a rare earth element, such as Nd, Gd, or Dy) $Li_5ZrP_3O_{12}$, $Li_5TiP_3O_{12}$, $Li_3Fe_2P_3O_{12}$, $Li_4NbP_3O_{12}$, $Li_{1+x}(M,Al,Ga)_x(Ge_{1-y}Ti_y)_{2-x}(PO_4)_3$ (wherein, 0.1≤x≤0.8, 0≤y≤1.0, and M is Nd, Sm, Eu, Gd, Tb, Dy, Ho, Er, Tm, or Yb), $Li_{1+x+y}Q_xTi_{2-x}Si_yP_{3-y}O_{12}$ (wherein, 0<x≤0.4, 0<y≤0.6, and Q is Al or Ga), $Li_6BaLa_2Ta_2O_{12}$, $Li_7La_3Zr_2O_{12}$, $Li_5La_3Nb_2O_{12}$, $Li_5La_3M_2O_{12}$ (wherein, M is Nb or Ta), and $Li_{7+x}A_xLa_{3-x}Zr_2O_{12}$ (wherein, 0<x<3, and A is Zn).

The electrolyte layer 13 may have a multi-layer structure as shown in FIG. 2. For example, the electrolyte layer 13 including the composite electrolyte in one or more layers selected from a first layer 131, a second layer 132, and a third layer 133 of the multi-layer structure shown in FIG. 2 may be disposed adjacent to and in contact with the cathode 11.

Figure 6:
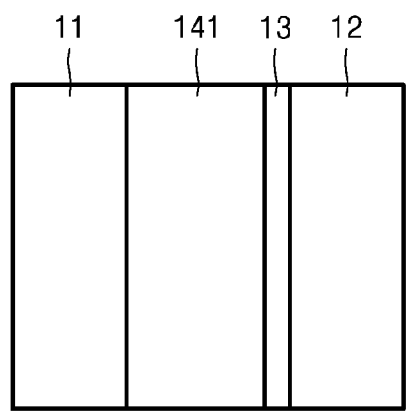
FIG. 6 is a schematic view of a lithium battery according to another embodiment.

The lithium battery may further include a separator disposed between the cathode and the anode. As shown in FIG. 6, a lithium battery may further include a cathode 11; an anode 12; an electrolyte layer 13 including the composite electrolyte disposed on the anode 12; and a separator 141 disposed between the cathode 11 and the electrolyte layer 13. A composition of the separator 141 will be described in detail in the description of a battery preparation method. The separator 141 may be used as impregnated with a liquid electrolyte.

In some embodiments, a lithium battery including the composite electrolyte may be manufactured as follows First, an anode is prepared.

As the anode, a lithium metal thin layer may be used by itself. Alternatively, the anode may include a current collector and an anode active material layer disposed on the current collector. For example, the anode may be used as the lithium metal thin layer is disposed on a conductive substrate, which is the current collector. The lithium metal thin layer may be integrated with the current collector.

In the anode, the current collector may be one selected from a stainless steel, copper, nickel, iron, and cobalt, but it is not limited thereto, and any metallic substrate that has excellent conductivity and is available in the art may be used. Examples of the current collector may include a conductive oxide substrate and a conductive polymer substrate. Also, the current collector may have various structures, for example, a type having one surface of an insulating substrate coated with a conductive material, a conductive metal oxide or a conductive polymer, in addition to a structure of the whole substrate formed of a conductive material. The current collector may be a flexible substrate. Thus, the current collector may be easily bent. Also, after bending, restoration to its original shape of the current collector may be easy.

Also, the anode may further include an anode active material other than a lithium metal. The anode may be an alloy of a lithium metal and other anode active material, a complex of a lithium metal and other anode active material, or a combination of a lithium metal and other anode active material.

The other anode active material that may be included in the anode may be, for example, at least one selected from a lithium alloyable metal, a transition metal oxide, a non-transition metal oxide, and a carbonaceous material.

Examples of the lithium alloyable metal may include Si, Sn, Al, Ge, Pb, Bi, Sb, a Si—Y alloy (wherein, Y is an alkaline metal, an alkaline earth metal, a group 13 element, a group 14 element, a transition metal, a rare earth element, or a combined element thereof, and is not Si), or a Sn—Y alloy (wherein, Y is an alkaline metal, an alkaline earth metal, a group 13 element, a group 14 element, a transition metal, a rare earth element, or a combined element thereof, and is not Sn). Examples of the element Y may include Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, and a combination thereof.

Examples of the transition metal oxide may include a lithium titanium oxide, a vanadium oxide, or a lithium vanadium oxide.

Examples of the non-transition metal oxide may include $SnO_2$ or $SiO_x$ (wherein, $0<x<2$).

The carbonaceous material may be crystalline carbon, amorphous carbon, or a combination thereof. The crystalline carbon may be graphite such as shapeless, plate, flake, spherical, or fibrous natural graphite or artificial graphite, and the amorphous carbon may be soft carbon (low-temperature fired carbon) or hard carbon, mesophase pitch carbide, or fired coke.

Alternatively, the anode may include other conventional anode active material instead of the lithium metal. The anode may be prepared by using an anode active material composition including a conventional anode active material, a conducting material, a binder, and a solvent that are generally used in the art, instead of the lithium metal.

For example, after preparing the conventional anode active material composition, a current collector is directly coated with the anode active material composition to form an anode plate, or the anode active material composition may be cast on a separate support to form an anode active material film, which is then separated from the support and laminated on a current collector to prepare an anode plate. The anode is not limited to a type described above, and any type of anode available in the art may be used. For example, the anode may be prepared by printing anode active material ink including a general anode active material or a general electrolyte on a current collector by using an additional inkjet method.

The conventional anode active material may be a powder. The powder form of the anode active material may be used in an anode active material composition or an anode active material ink.

Examples of the conducting material may include carbon black or graphite particulates, but they are not limited thereto, and any conducting material available in the art may be used.

Examples of the binder may include a vinylidene fluoride/hexafluoropropylene copolymer, polyvinylidene fluoride (PVDF), polyacrylonitrile, polymethylmethacrylate, polytetrafluoroethylene, a combination thereof, or a styrene butadiene rubber polymer, but they are not limited thereto, and any binder available in the art may be used.

Examples of the solvent may include N-methyl-pyrrolidone (NMP), acetone, and water, but they are not limited thereto, and any solvent available in the art may be used.

The amounts of the general anode active material, the conducting material, the binder, and the solvent are those levels that are generally used in the manufacture of a lithium battery. Depending on the use or structure of the lithium battery, one or more of the conducting material, the binder, and the solvent may be omitted.

Next, a composite electrolyte composition is prepared.

The composite electrolyte composition may be prepared by adding and mixing a polymeric ionic liquid, an oligomer, and a lithium salt. The polymeric ionic liquid, oligomer, and lithium salt that may be used in the preparation of the composite electrolyte may be the same as described above. Examples of the composite electrolyte composition may be prepared by adding and mixing 100 parts by weight of poly(diallyldimethylammonium)TFSi and 100 parts by weight of a combination including poly(ethyleneglycoldimethyl)methacrylate (POEM) and a lithium salt (LiTFSi) at a molar ratio of 2:1 in dimethylformamide (DMF) solvent.

An anode is coated with the composite electrolyte composition thus prepared, dried at room temperature to remove the solvent (DMF), and thus the anode coated with a composite electrolyte layer may be obtained.

Next, a cathode may be prepared as follows.

A cathode active material composition may be prepared in the same manner as in preparation of the anode active material composition, except that a cathode active material is used instead of the anode active material.

In the cathode active material composition, a conducting material, a binder, and a solvent may be the same as those defined in connection with the anode active material composition. The cathode active material composition is prepared by mixing the cathode active material, the conducting material, the binder, and the solvent. An aluminum current collector is directly coated with the cathode active material composition and dried to prepare a cathode plate on which a cathode active material layer is formed. Alternatively, the cathode active material composition may be cast on a separate support, and then a film separated from the support may be laminated on the aluminum current collector to prepare a cathode plate on which a cathode active material layer is formed.

The cathode active material is a lithium-containing metal oxide which may be any available in the art. For example, at least one type of a composite oxide of lithium and a metal selected from cobalt, manganese, nickel, and a combination thereof, and examples of the composite oxide may include a compound represented by one of the following chemical formulae: $Li_aA_{1-b}B'_bD'_2$ (wherein $0.90 \leq a \leq 1.8$, and $0 \leq b \leq 0.5$); $Li_aE_{1-b}B'_bO_{2-c}D'_c$ (wherein $0.90 \leq a \leq 1.8$, $0 \leq b \leq 0.5$, and $0 \leq c \leq 0.05$); $LiE_{2-b}B'_bO_{4-c}D'_c$ (wherein $0 \leq b \leq 0.5$, and $0 \leq c \leq 0.05$); $Li_aNi_{1-b-c}Co_bB'_cD'_\alpha$ (wherein $0.90 \leq a \leq 1.8$, $0 \leq b \leq 0.5$, $0 \leq c \leq 0.05$, and $0 < \alpha \leq 2$); $Li_aNi_{1-b-c}Co_bB'_cO_{2-\alpha}F_\alpha$ (wherein $0.90 \leq a \leq 1.8$, $0 \leq b \leq 0.5$, $0 \leq c \leq 0.05$, and $0 < \alpha < 2$); $Li_aNi_{1-b-c}Co_bB'_cO_{2-\alpha}F_2$ (wherein $0.90 \leq a \leq 1.8$, $0 \leq b \leq 0.5$, $0 \leq c \leq 0.05$, and $0 < \alpha < 2$); $Li_aNi_{1-b-c}Mn_bB'_cD'_\alpha$ (wherein $0.90 \leq a \leq 1.8$, $0 \leq b \leq 0.5$, $0 \leq c \leq 0.05$, and $0 < \alpha \leq 2$); $Li_aNi_{1-b-c}Mn_bB'_cO_{2-\alpha}F_\alpha$ (wherein $0.90 \leq a \leq 1.8$, $0 \leq b \leq 0.5$, $0 \leq c \leq 0.05$, and $0 < \alpha < 2$); $Li_aNi_{1-b-c}Mn_bB'_cO_{2-\alpha}F_2$ (wherein $0.90 \leq a \leq 1.8$, $0 \leq b \leq 0.5$, $0 \leq c \leq 0.05$, and $0 < \alpha < 2$); $Li_aNi_bE_cG_dO_2$ (wherein $0.90 \leq a \leq 1.8$, $0 \leq b \leq 0.9$, $0 \leq c \leq 0.5$, and $0.001 \leq d \leq 0.1$); $Li_aNi_bCo_cMn_dGeO_2$ (wherein $0.90 \leq a \leq 1.8$, $0 \leq b \leq 0.9$, $0 \leq c \leq 0.5$, $0 \leq d \leq 0.5$, and $0.001 \leq e \leq 0.1$); $Li_aNiG_bO_2$ (wherein $0.90 \leq a \leq 1.8$, and $0.001 \leq b \leq 0.1$); $Li_aCoG_bO_2$ (wherein $0.90 \leq a \leq 1.8$, and $0.001 \leq b \leq 0.1$); $Li_aMnG_bO_2$ (wherein $0.90 \leq a \leq 1.8$, and $0.001 \leq b \leq 0.1$); $Li_aMn_2G_bO_4$ (wherein $0.90 \leq a \leq 1.8$, and $0.001 \leq b \leq 0.1$); $QO_2$; $QS_2$; $LiQS_2$; $V_2O_5$; $LiV_2O_5$; $LiI'O_2$; $LiNiVO_4$; $Li_{(3-f)}J_2(PO_4)_3$ (wherein $0 \leq f \leq 2$); $Li_{(3-f)}Fe_2(PO_4)_3$ (wherein $0 \leq f \leq 2$); and $LiFePO_4$.

In the formulae above, A is nickel (Ni), cobalt (Co), manganese (Mn), or a combinations thereof; B' is aluminum (Al), nickel (Ni), cobalt (Co), manganese (Mn), chromium (Cr), iron (Fe), magnesium (Mg), strontium (Sr), vanadium (V), a rare earth element, or a combination thereof; D' is oxygen (O), fluorine (F), sulfur (S), phosphorus (P), or a combination thereof; E is cobalt (Co), manganese (Mn), or a combination thereof; F is fluorine (F), sulfur (S), phosphorus (P), or a combination thereof; G is aluminum (Al), chromium (Cr), manganese (Mn), iron (Fe), magnesium (Mg), lanthanum (La), cerium (Ce), strontium (Sr), vanadium (V), or a combination thereof; Q is titanium (Ti), molybdenum (Mo), manganese (Mn), or a combination thereof; I' is chromium (Cr), vanadium (V), iron (Fe), scandium (Sc), yttrium (Y), or a combination thereof; and J is vanadium (V), chromium (Cr), manganese (Mn), cobalt (Co), nickel (Ni), copper (Cu), or a combinations thereof.

Examples of the cathode active material may include $LiCoO_2$, $LiMn_xO_{2x}$ (wherein, x is 1 or 2), $LiNi_{1-x}Mn_xO_{2x}$ (wherein, $0<x<1$), $Ni_{1-x-y}Co_xMn_yO_2$ (wherein, $0 \leq x \leq 0.5$, and $0 \leq y \leq 0.5$), and $LiFePO_4$.

A surface of the compound may have a coating layer or the compound and a compound having a coating layer may be used as a combination. The coating layer may include a compound of a coating element such as an oxide of a coating element, a hydroxide of a coating element, an oxyhydroxide of a coating element, an oxycarbonate of a coating element, or a hydroxyl carbonate of a coating element. The compound forming the coating layer may be amorphous or crystalline. The coating element included in the coating layer may be Mg, Al, Co, K, Na, Ca, Si, Ti, V, Sn, Ge, Ga, B, As, Zr, or a combination thereof. A formation process (e.g., spray coating or dip-coating) of the coating layer may be any coating method that does not negatively affect physical properties of the cathode active material by using the elements above, and the coating method may be well understood by those of ordinary skill in the art, so the description of the coating method is omitted in the present specification.

The amounts of the general cathode active material, the conducting material, the binder, and the solvent are those levels that are generally used in the manufacture of a lithium battery.

Next, a separator to be disposed between the cathode and the anode is prepared.

The separator for the lithium battery may be any separator that is commonly used in lithium batteries. The separator may have low resistance to migration of ions in an electrolyte and have an excellent electrolyte-retaining ability. For example, the separator may be selected from glass fiber, polyester, Teflon, polyethylene, polypropylene, polytetrafluoroethylene (PTFE), and a combination thereof, each of which may be a non-woven or woven fabric. For example, a rollable separator including polyethylene or polypropylene may be used for a lithium ion battery. A separator with a good organic electrolyte solution-retaining ability may be used for a lithium ion polymer battery. For example, the separator may be manufactured in the following manner.

A polymer resin, a filler, and a solvent may be mixed together to prepare a separator composition. Then, an electrode is directed coated with the separator composition, and then dried to form the separator. Alternatively, the separator composition may be cast on a support and then dried to form a separator film, which may then be separated from the support and laminated on an electrode to form the separator.

The polymer resin used to manufacture the separator may be any material that is commonly used as a binder for electrode plates. For example, the polymer resin may be a vinylidenefluoride/hexafluoropropylene copolymer, polyvinylidene fluoride (PVDF), polyacrylonitrile, polymethylmethacrylate, or a combination thereof.

Next, a liquid electrolyte is prepared.

For example, an organic electrolyte solution is prepared. The organic electrolyte solution may be prepared by dissolving a lithium salt in an ionic liquid and/or an organic solvent.

The ionic liquid may be any appropriate ionic liquid available in the art. For example, the ionic liquid may be Pyr13FSI(N-propyl, N-methyl pyrrolidinium, bis(fluorosulfonyl)imide), Pyr14FSI(N-butyl, N-methyl pyrrolidinium, bis(fluorosulfonyl)imide), Pyr13TFSI(N-propyl, N-methyl pyrrolidinium, bis(trifluoromethanesulfonyl)imide), Pyr14TFSI(N-butyl, N-methyl pyrrolidinium, bis(trifluoromethanesulfonyl)imide), Pyr13TBETI(N-propyl, N-methyl pyrrolidinium, bis(pentafluoroethanesulfonyl)imide), Pyr14BETI(N-butyl, N-methyl pyrrolidinium, bis(pentafluoroethanesulfonyl)imide), Pyr131M14(N-propyl, N-methyl pyrrolidinium, bis(nonafluorobutyl-sulfonyl) imide), Pyr141M14(N-butyl, N-methyl pyrrolidinium, bis (nonafluorobutyl-sulfonyl)imide), or a combination thereof.

The organic solvent may be any organic solvent available in the art. Examples of the organic solvent may include an ether solvent, a carbonate solvent, a nitrile solvent, an ester solvent, an amide solvent, an aromatic solvent, and a halogen substituted or unsubstituted hydrocarbon solvent, but they are not limited thereto, and any organic solvent available in the art may be used.

For example, the organic solvent may be propylene carbonate, ethylene carbonate, fluoroethylene carbonate, diethyl carbonate, methyl ethyl carbonate, methyl propyl carbonate, butylene carbonate, benzonitrile, acetonitrile, tetrahydrofuran, 2-methyltetrahydrofuran, γ-butyrolactone, dioxolane, 4-methyldioxolane, N,N-dimethyl formamide, dimethylacetamide, dimethylsulfoxide, 1,4-dioxane, 1,2-dimethoxyethane, sulfolane, dichloroethane, chlorobenzene, nitrobenzene, dimethyl carbonate, methyl isopropyl carbonate, ethyl propyl carbonate, dipropyl carbonate, dibutyl carbonate, diethylene glycol dimethyl ether, diethylene glycol diethyl ether, or a combination thereof.

The lithium salt may be any material available as a lithium salt in the art. For example, the lithium salt may be $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_2$, $LiAlCl_4$, $LiN(C_xF_{2x+1}SO_2)(C_yF_{2y+1}SO_2)$ (wherein, $1 \leq x \leq 20$ and $1 \leq y \leq 20$), LiCl, LiI, or a combination thereof.

Figure 7:
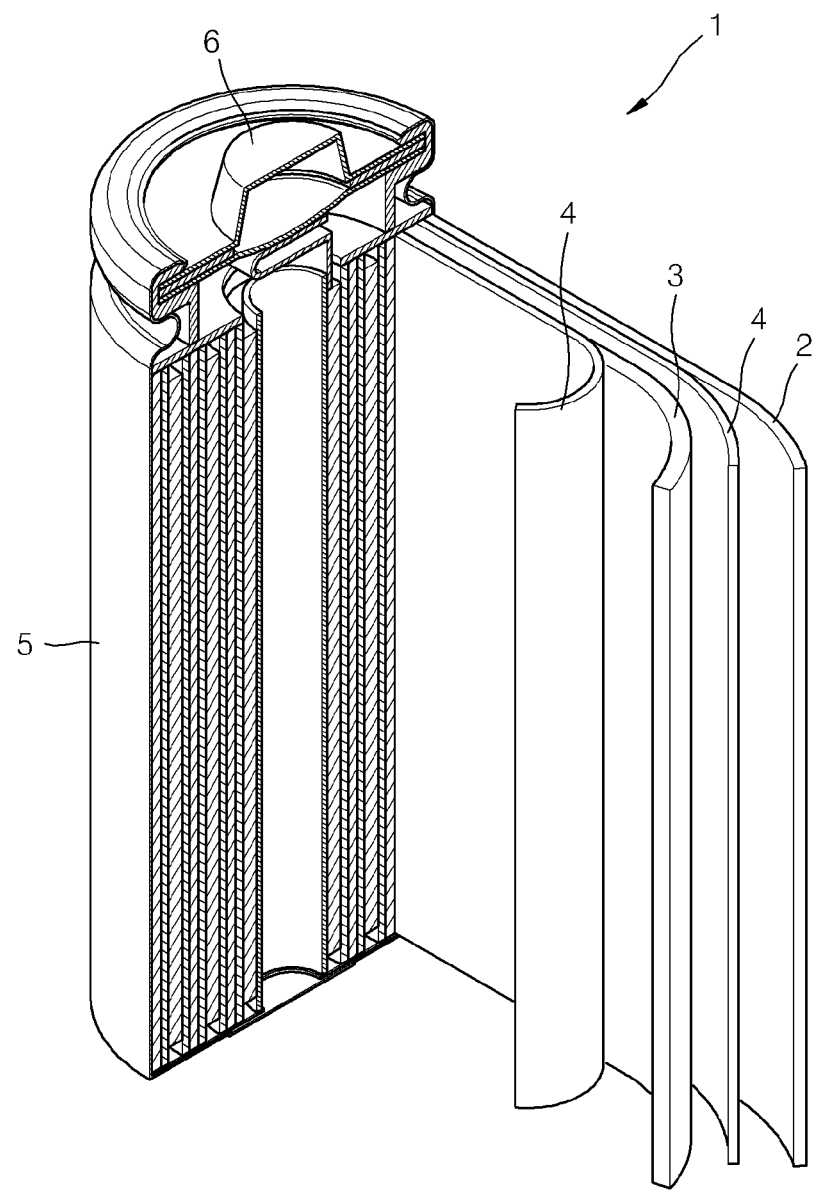
FIG. 7 is a schematic view of a lithium battery according to another embodiment.

Next, a lithium battery is assembled. For example, as shown in FIG. 7, a lithium battery 1 includes a cathode 3, an anode 2 coated with the composite electrolyte layer, and a separator 4. The cathode 3, the anode 2 and the separator 4 are wound or folded, and then accommodated in a battery case 5. Then, the battery case 5 is filled with an organic electrolyte solution and sealed with a cap assembly 6, thereby completing manufacture of the lithium battery 1. Although not shown in the drawing, an electrolyte layer including a composite electrolyte is formed on the anode 2 facing the cathode 3. The battery case 5 may be a cylindrical type, a rectangular type, or a thin-film type. For example, the lithium battery 1 may be a thin-film type battery. The lithium battery 1 may be a lithium ion battery.

The separator may be interposed between the cathode and the anode to form a battery assembly. Alternatively, the battery assembly may be stacked in a bi-cell structure and impregnated with the electrolyte solution. The resultant is put into a pouch and hermetically sealed, thereby completing manufacture of a lithium ion polymer battery.

Alternatively, a plurality of battery assemblies may be stacked to form a battery pack, which may be used in any device that requires high capacity and high output, for example, in a laptop computer, a smart phone, or an electric vehicle (EV).

The lithium battery is not particularly limited to a lithium ion battery or a lithium polymer battery and may include a lithium air battery or a lithium all-solid battery.

Hereinafter, one or more embodiments will be described in detail with reference to the following examples. However, these examples are not intended to limit the scope of the one or more embodiments.

Preparation of Polymeric Ionic Liquid and Oligomeric Electrolyte

PREPARATION EXAMPLE 1

Preparation of Polymeric Ionic Liquid

A solution prepared by dissolving 8.52 grams (g) of lithium bis(trifluoromethanesulfonyl)imide (LiTFSi) in 10 milliliters (ml) of distilled water and another solution prepared by dissolving 4 g of poly(diallyldimethylammonium) chloride (#409030, available from Aldrich, weight-average molecular weight: 200,000 to 350,000 Daltons (Da), 20 percent by weight (wt %) in water) represented by Formula 11 in 100 ml of distilled water were added to a 250 ml-round-bottom flask. The reaction mixture was stirred for 5 minutes at room temperature (20° C.) to obtain white crystals as a precipitate. The white crystals were filtered and dried in a vacuum oven at a temperature of 120° C., and thus poly(diallyldimethylammonium)TFSi represented by Formula 12 was prepared. Yield of poly(diallyldimethylammonium)TFSi was about 93.5% by weight.

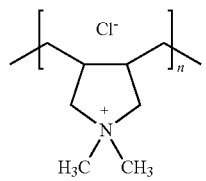

Formula 11

In Formula 11, n was about 2,500.

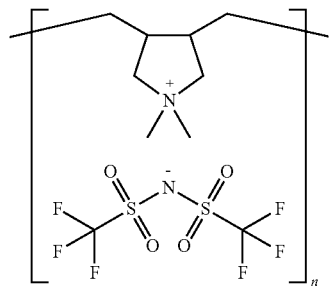

Formula 12

In Formula 12, n was about 2,500.

PREPARATION EXAMPLE 2

Preparation of Oligomeric Electrolyte, PEOM 2.87 g of LiTFSi was added to 10 ml of an oligomer, poly(ethyleneglycol)methacrylate (PEOM, #409529, available from Aldrich, number-average molecular weight (Mn): 500), as an electrolyte, at a molar ratio of POEM LiTFSi=2:1, and stirred for 6 hours at room temperature to prepare an oligomeric electrolyte.

PREPARATION EXAMPLE 3

Preparation of Oligomeric Electrolyte, PEOA 2.87 g of LiTFSi was added to 10 ml of an oligomer, poly(ethyleneglycol)acrylate (PEOA, #469823, available from Aldrich, number-average molecular weight (Mn): about 375), as an electrolyte, and stirred for 6 hours at room temperature to prepare an oligomeric electrolyte.

PREPARATION EXAMPLE 4

Preparation of Oligomeric Electrolyte, PEOMEA 2.87 g of LiTFSi was added to 10 ml of an oligomer, poly(ethyleneglycol) methyl ether acrylate (PEOMEA, #454990, available from Aldrich, number-average molecular weight (Mn): 480), as an electrolyte, and stirred for 6 hours at room temperature to prepare an oligomeric electrolyte.

Preparation of Composite Electrolyte and Anode

EXAMPLE 1

Preparation of Composite Electrolyte and Anode, Thickness of Composite Electrolyte Layer: 3 Micrometers (μm)

Poly(diallyldimethylammonium)TFSi of Formula 12 prepared in Preparation Example 1 and the oligomeric electrolyte prepared in Preparation Example 2 were mixed at a weight ratio of 1:1 to prepare a mixture, and dimethylformamide (DMF) in an amount twice the weight of the mixture was added and stirred for 24 hours to prepare a composition for forming a composite electrolyte.

A lithium metal thin film having a thickness of 20 μm on a copper current collector was coated with the composition by using a doctor blade, dried at a high temperature (40° C.), and vacuum dried at room temperature (20° C., for 2 hours) to prepare an anode having a structure including an composite electrolyte layer at a thickness of 3 μm coated on the lithium metal.

EXAMPLE 2

Preparation of Composite Electrolyte and Anode, Thickness of Composite Electrolyte Layer: 20 μm A composite electrolyte and an anode were prepared in the same manner as in Example 1, except that the thickness of the composite electrolyte layer was changed to 20 μm.

EXAMPLE 3

Preparation of Composite Electrolyte and Anode, PEOA Oligomer

A composite electrolyte and an anode were prepared in the same manner as in Example 1, except that the oligomeric electrolyte prepared in Preparation Example 3 was used instead of the oligomeric electrolyte prepared in Preparation Example 2.

EXAMPLE 4

Preparation of Composite Electrolyte and Anode, PEOMEA Oligomer

A composite electrolyte and an anode were prepared in the same manner as in Example 1, except that the oligomeric electrolyte prepared in Preparation Example 4 was used instead of the oligomeric electrolyte prepared in Preparation Example 2.

EXAMPLE 5

Preparation of Composite Electrolyte and Anode, Containing Inorganic Particles (Al$_2$O$_3$)

A composite electrolyte and an anode were prepared in the same manner as in Example 1, except that poly(diallyldimethylammonium)TFSi of Formula 12 prepared in Preparation Example 1, the oligomeric electrolyte prepared in Preparation Example 2, and alumina (Al$_2$O$_3$) particles having an average particle diameter of 10 nanometers (nm) (Lot#1041-070510, available from Nanoamor, 10 nm, 99% purity, 160 square meters per gram (m$^2$/g)) were mixed at a weight ratio of 1:1:2.

COMPARATIVE EXAMPLE 1

Bare Li Metal Anode

The lithium metal thin film having a thickness of 20 μm on the copper current collector itself was used as an anode.

COMPARATIVE EXAMPLE 2

Preparation of Composite Electrolyte and Anode, Carbonate Organic Electrolyte An anode having a composite electrolyte layer coated thereon was prepared in the same manner as in poly(diallyldimethylammonium)TFSi of Formula 12 prepared in Preparation Example 1 and a liquid electrolyte (prepared by dissolving 1.3 molar (M) of LiPF$_6$ in a mixture solvent including ethylene carbonate (EC):diethyl carbonate (DEC): fluoroethylene carbonate (FEC) of 2:6:2 at a volume ratio) were added to dimethylformamide (DMF) at a weight ratio of 2:3 to obtain 10 wt % poly(diallyldimethylammonium) TFSi solution, stirred for 24 hours to prepare a composition for a composite electrolyte.

Preparation of Full Cell

EXAMPLE 6

A LiCoO$_2$ powder and a carbon conducting material (Super-P; available from Timcal Ltd.) were homogeneously mixed at a weight ratio of 90:5, and a polyvinylidene fluoride (PVDF) binder solution was added thereto to prepare a cathode active material slurry at a weight ratio of the active material:carbon conducting agent:binder=90:5:5.

The slurry thus prepared was coated in an aluminum substrate (thickness: 15 μm) by using a doctor blade, dried under reduced pressure at a temperature of 120° C., and pressed by using a roll-press in the form of a sheet to prepare a cathode.

A polypropylene separator (Celgard 3510) was disposed between the cathode thus prepared and the anode prepared in Example 1, and an ionic liquid electrolyte was injected thereto to prepare a coin cell. The anode was disposed such that the composite electrolyte layer faces the cathode.

The ionic liquid electrolyte was a solution in which 0.4 M LiFePF$_6$ was dissolved in a mixture of Pyr13FSI represented by Formula 13 and diethylene glycol dimethyl ether (DEGDME) at a volume ratio of 4:6.

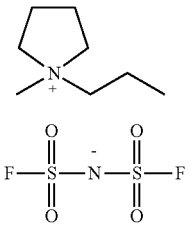

Formula 13

EXAMPLES 7 to 10

Lithium batteries were prepared in the same manner as in Example 6, except that the anodes prepared in Examples 2 to 5 were used instead of the anode prepared in Example 1, respectively.

COMPARATIVE EXAMPLES 3 and 4

Lithium batteries were prepared in the same manner as in Example 6, except that the anodes prepared in Comparative Examples 1 and 2 were used instead of the anode prepared in Example 1, respectively.

Preparation of 3-Electrode Cell

EXAMPLE 11

The electrode prepared in Example 1 was used as a working electrode, a lithium metal was used as each of a reference electrode and a counter electrode, an ionic liquid electrolyte prepared by dissolving 0.4 M LiPF$_6$ in a mixture solvent of Pyr13FSI represented by Formula 13 and diethylene glycol dimethyl ether (DEGDME) at a volume ratio of 4:6 as a liquid electrode to prepare a 3-electrode cell.

EXAMPLES 12 to 15

3-electrode cells were manufactured in the same manner as in Example 11, except that the electrodes prepared in Examples 2 to 5 were used instead of the electrode prepared in Example 1, respectively.

COMPARATIVE EXAMPLES 5 and 6

3-electrode cells were manufactured in the same manner as in Example 11, except that the electrodes prepared in Comparative Examples 1 and 2 were used instead of the electrode prepared in Example 1, respectively.

EVALUATION EXAMPLE 1

Electrochemical Stability Evaluation

A voltage change of the working electrode was evaluated by performing a lithium stripping/deposition cycle on the 3-electrode cells prepared according to Examples 11 to 15 and Comparative Examples 5 and 6, while a high constant current of 0.56 milli Amperes per centimeter (mA/cm$^2$) was supplied thereto alternatively in the forward and backward directions. The results with respect to the anodes of Example 11 and Comparative Example 6 are shown in FIGS. 8A and 8B.

Figure 8A:
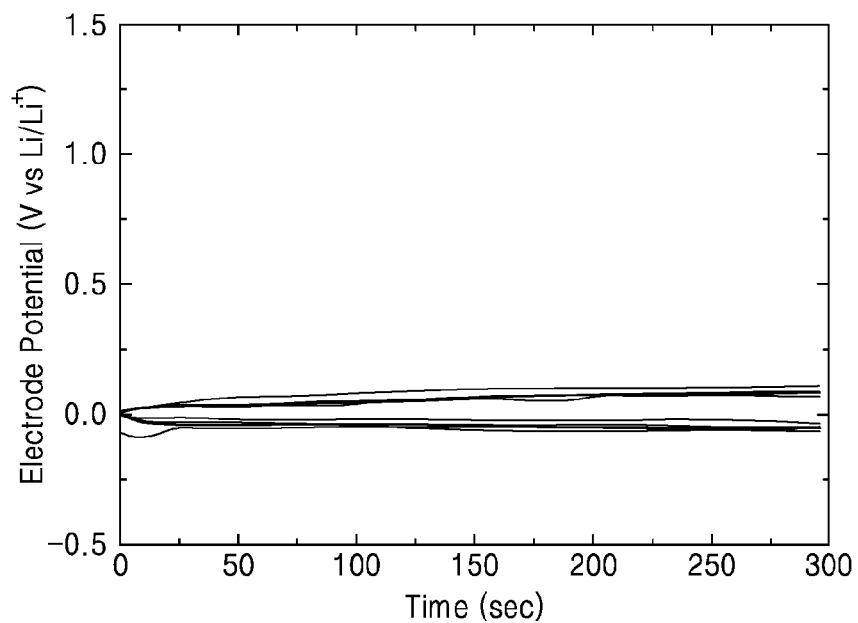
FIG. 8A is a graph of electrode potential versus Li/Li$^+$ (Volts, V) versus time (seconds, sec) illustrating the results of stripping/deposition test performed on a lithium battery prepared in Example 11.

As shown in FIG. 8A, the electrode of Example 11 had only reversible stripping/deposition of lithium after 200$^{th}$ cycle and no side reaction, and thus a voltage change of the working electrode was negligible.

Figure 8B:
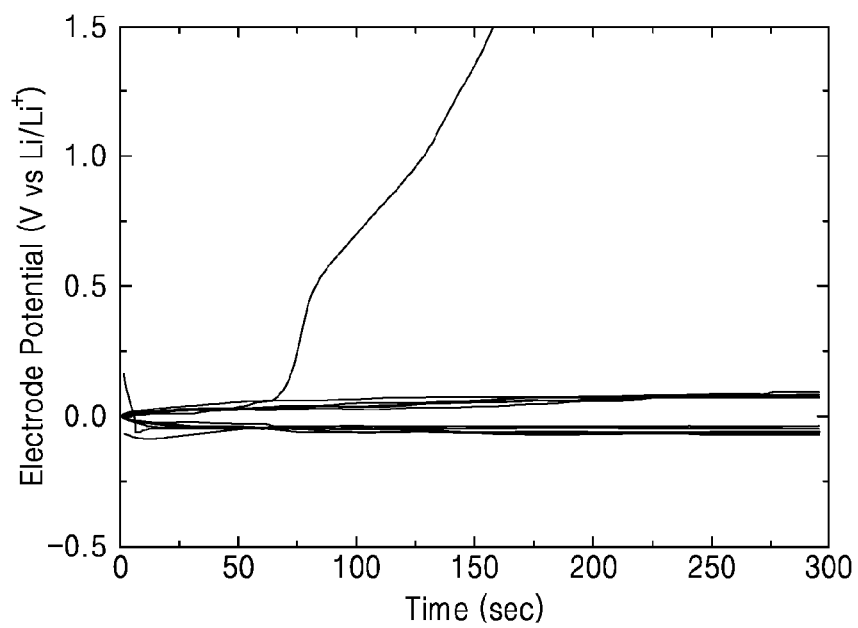
FIG. 8B is a graph of electrode potential versus Li/Li$^+$ (Volts, V) versus time (seconds, sec) illustrating the results of stripping/deposition test performed on a lithium battery prepared in Comparative Example 6.

As shown in FIG. 8B, the electrode of Comparative Example 6 had a side reaction during stripping/deposition of lithium from $200^{th}$ cycle, and thus a voltage the working electrode changed rapidly.

Therefore, it was confirmed that stability of the composite electrolyte layer on the electrode of Example 11 was improved compared to that of the composite electrolyte layer on the electrode of Comparative Example 6.

EVALUATION EXAMPLE 2

Impedance Measurement

A resistance of the membrane-electrode assembly (MEA) was measured by using a 2-probe method with an impedance analyzer (Solartron 1260A Impedance/Gain-Phase Analyzer) with respect to each of the lithium batteries (full cells) prepared in Examples 6 to 10 and Comparative Examples 3 and 4. An amplitude was ±10 milli Volts (mV), and a frequency range was about 0.1 Hertz (Hz) to about 10 mega Hertz (MHz).

Figure 9A:
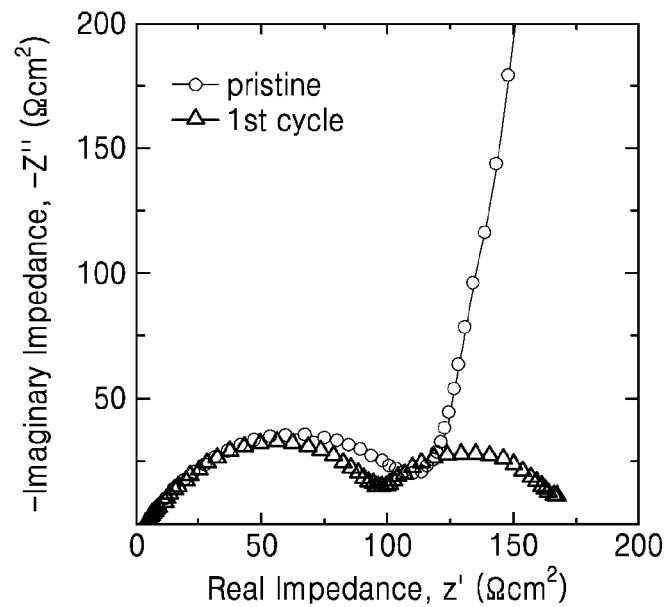
FIG. 9A is a graph of negative imaginary impedance (Ohm square centimeters, $\Omega \cdot cm^2$) versus real impedance (Ohm square centimeters, $\Omega \cdot cm^2$) illustrating a Nyquist plot of impedance measurement results before charging/discharging (pristine status) and after one cycle of charging/discharging of a lithium battery prepared in Comparative Example 3.
Figure 9B:
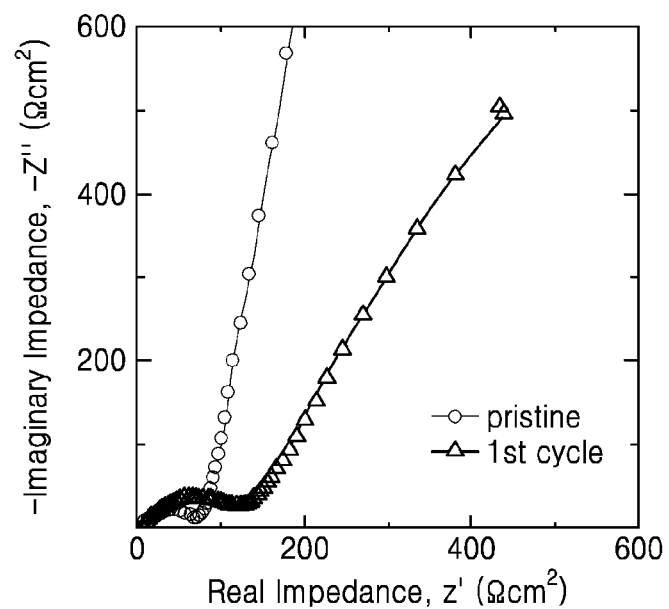
FIG. 9B is a graph of negative imaginary impedance (Ohm square centimeters, $\Omega \cdot cm^2$) versus real impedance (Ohm square centimeters, $\Omega \cdot cm^2$) illustrating a Nyquist plot of impedance measurement results before charging/discharging (pristine status) and after one cycle of charging/discharging of a lithium battery prepared in Comparative Example 4.
Figure 9C:
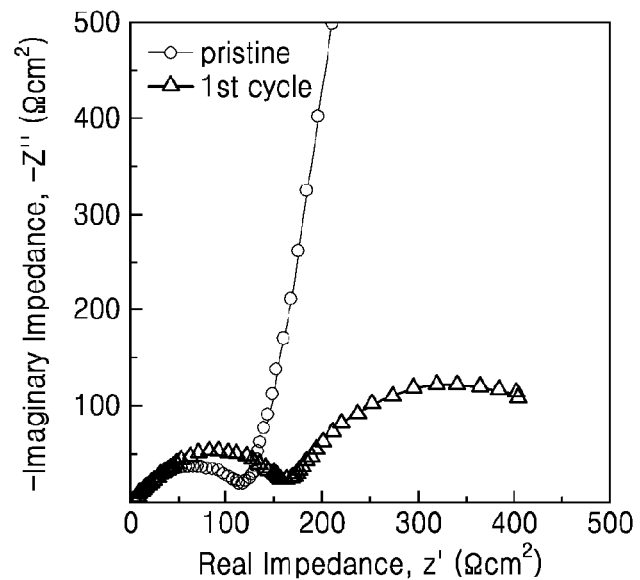
FIG. 9C is a graph of negative imaginary impedance (Ohm square centimeters, $\Omega \cdot cm^2$) versus real impedance (Ohm square centimeters, $\Omega \cdot cm^2$) illustrating a Nyquist plot of impedance measurement results before charging/discharging (pristine status) and after one cycle of charging/discharging of a lithium battery prepared in Example 6.

After preparing cells in Example 6 and Comparative Examples 3 and 4, impedances of the cells were measured before performing a charging/discharging cycle (pristine), and impedances of the cells were measured again after one cycle of charging/discharging lithium with a constant current at 0.1 Coulomb (C) rate in a voltage range of about 3 Volts (V) to about 4.4V, and Nyquist plots of the impedance measurement results are shown in FIGS. 9A to 9C, respectively.

An interfacial resistance ($R_{int}$) of the electrode (i.e., anode) is determined by the location and size of a semicircle. A difference between the left side x-intercept and the right side x-intercept of the semicircle denotes an interfacial resistance ($R_{int}$) of an electrode.

As shown in FIGS. 9A to 9C, the interfacial resistances of the cells before performing the charging/discharging cycle were similar. However, after performing one cycle of the charging/discharging, the interfacial resistance of the electrode prepared in Comparative Example 3 (FIG. 9A) decreased, whereas the interfacial resistances of the electrodes prepared in Comparative Example 4 (FIG. 9B) and Example 6 (FIG. 9C) increased.

It is deemed that the interfacial resistance of the electrode prepared in Comparative Example 3 decreased due to a side reaction occurred during the charging/discharging process which increased a surface area of the electrode, and the interfacial resistances of the electrodes prepared in Example 6 and Comparative Example 4 increased due to a stable solid electrolyte layer (i.e., a solid electrolyte interface (SEI)) which was formed at an interface between the composite electrolyte layer and the lithium metal.

EVALUATION EXAMPLE 3

Charging/Discharging Test

The lithium batteries (full cells) prepared in Examples 6 to 10 and Comparative Examples 3 and 4 were charged and discharged at a constant current of 0.1 C rate (0.35 mA/cm$^2$) in a voltage range of about 3.0V to about 4.4V with respect to lithium at room temperature (20° C.), and the cycle of charging and discharging was repeated 25 times. A part of the charging and discharging test results are shown in Table 1 and FIGS. 10A to 10C.

Initial discharge capacities and charging/discharging efficiencies and capacity retention rates during $25^{th}$ cycle are shown in Table 1. The initial discharge capacities in Table 1 are discharge capacities during the first cycle. In Table 1, charging/discharging efficiencies during $25^{th}$ cycle ($25^{th}$ cycle coulombic efficiency) are ratios of charging capacities and discharging capacities at $25^{th}$ cycle. The charging/discharging efficiencies and capacity retention rates at $25^{th}$ cycle are calculated from Equations 1 and 2.

Charging/discharging efficiency during $25^{th}$ cycle (%)=[discharging capacity during $25^{th}$ cycle/charging capacity during $25^{th}$ cycle]×100     Equation 1

Capacity retention rate (%)=[discharging capacity during $25^{th}$ cycle/discharging capacity during $1^{st}$ cycle]×100     Equation 2

TABLE 1

| | Initial discharging capacity [mAh/g] | Charging/discharging efficiency at $25^{th}$ cycle [%] | Capacity retention rate during $25^{th}$ cycle [%] |
|---|---|---|---|
| Example 6 | 156.5 | 95.9 | 79 |
| Comparative Example 3 | 156.5 | 69.9 | 2.2 |
| Comparative Example 4 | 159 | 55.1 | 0.3 |

Figure 10A:
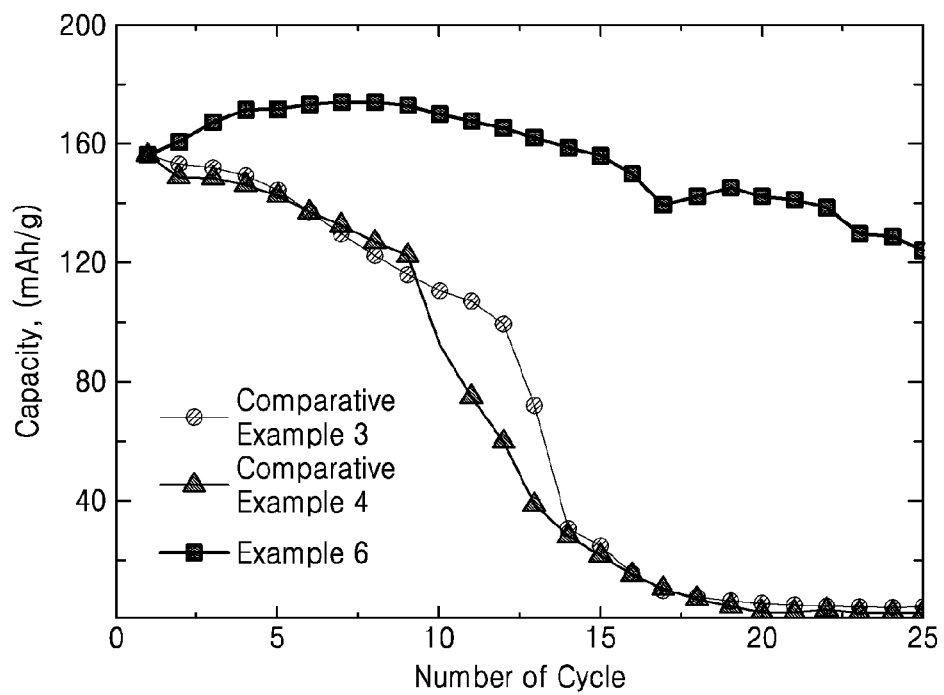
FIG. 10A is a graph of capacity (milli Ampere hours per gram, mA·h/g) versus number of cycle showing the results of lifespan characteristic test of the lithium batteries prepared in Example 6 and Comparative Examples 3 and 4.
Figure 10B:
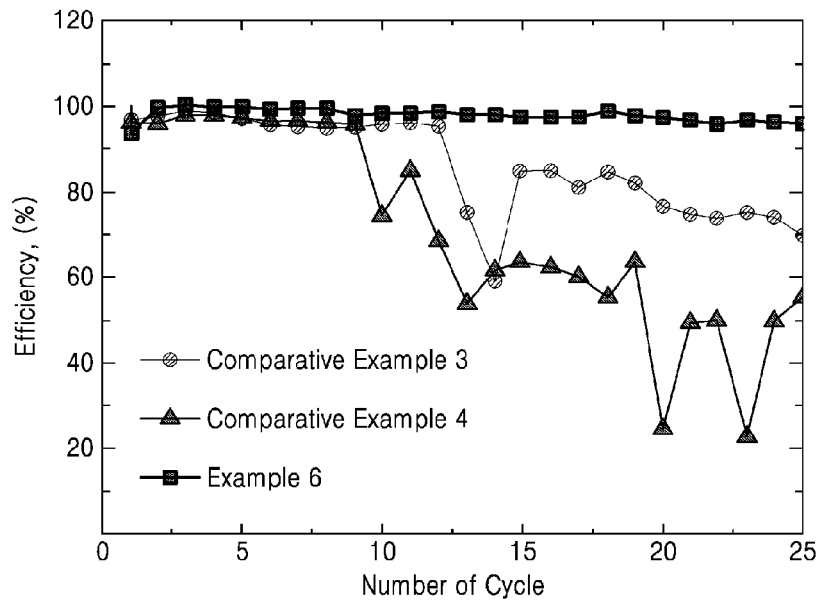
FIG. 10B is a graph of efficiency (percent, %) versus number of cycle showing the results of charging/discharging efficiency test of the lithium batteries prepared in Example 6 and Comparative Examples 3 and 4.
Figure 10C:
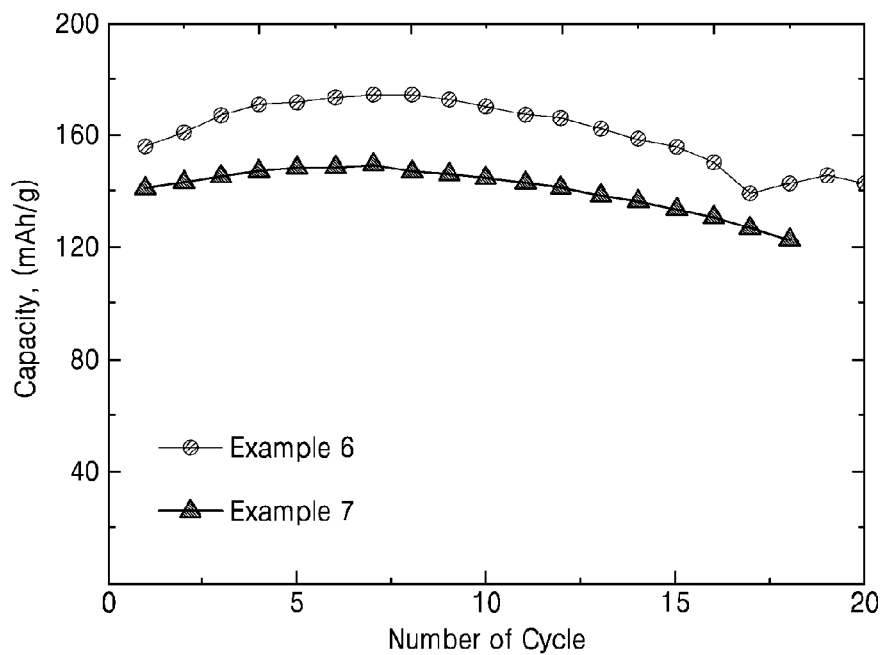
FIG. 10C is a graph of capacity (milli Ampere hours per gram, mA·h/g) versus number of cycle showing the results of lifespan characteristics test of the lithium batteries prepared in Example 7 and Comparative Example 7.

As shown in Table 1 and FIGS. 10A and 10B, lifespan characteristics and charging/discharging efficiency of the lithium battery of Example 6 including the anode coated with the composite electrolyte layer improved significantly compared to those of the lithium batteries prepared in Comparative Examples 3 and 4. Also, as shown in FIG. 10C, lifespan characteristics of the lithium battery of Example 6 were similar to those of the lithium battery of Example 7.

As described above, according to the one or more of the above exemplary embodiments, a lithium battery including a composite electrolyte may have improved lifespan characteristics and charging/discharging efficiency.

It should be understood that the exemplary embodiments described therein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. A composite electrolyte comprising:

a polymeric ionic liquid; and an oligomeric electrolyte, wherein the oligomeric electrolyte consists of at least one oligomer selected from a polyether oligomer, a polyvinyl alcohol oligomer, a polyvinyl lactam oligomer, a polysiloxane oligomer, a polyethylene glycol oligomer, and a polypropylene glycol oligomer, wherein the polymeric ionic liquid is one selected from the group consisting of Formula 1a or Formula 1b:

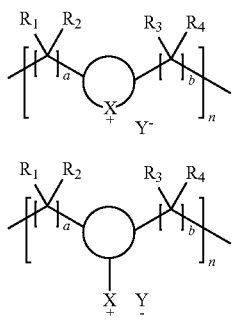

Formula 1a

Formula 1b wherein, in Formulae 1a and 1b,

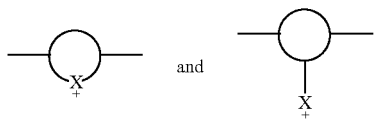

are each independently comprising a 3 to 31 membered group comprising 2 to 30 carbon atoms and optionally at least one heteroatom in addition to X, wherein the 3 to 31 membered group comprises an unsubstituted or substituted $C_3$-$C_{30}$ cycloalkyl ring, an unsubstituted or substituted $C_6$-$C_{30}$ aryl ring, or an unsubstituted or substituted $C_2$-$C_{30}$ heteroaryl ring;

X is S, —N($R_5$)($R_6$), —N($R_5$), —P($R_5$), or —P($R_5$)($R_6$);

$R_1$ to $R_6$ are each independently a hydrogen, an unsubstituted or substituted $C_1$-$C_{30}$ alkyl group, an unsubstituted or substituted $C_1$-$C_{30}$ heteroalkyl group, an unsubstituted or substituted $C_1$-$C_{30}$ alkoxy group, an unsubstituted or substituted $C_6$-$C_{30}$ aryl group, an unsubstituted or substituted $C_7$-$C_{30}$ arylalkyl group, an unsubstituted or substituted $C_6$-$C_{30}$ aryloxy group, an unsubstituted or substituted $C_6$-$C_{30}$ arylthio group, an unsubstituted or substituted $C_3$-$C_{30}$ heteroaryl group, an unsubstituted or substituted $C_4$-$C_{30}$ heteroarylalkyl group, an unsubstituted or substituted $C_3$-$C_{30}$ heteroaryloxy group, an unsubstituted or substituted $C_3$-$C_{30}$ heteroarylthio group, an unsubstituted or substituted $C_3$-$C_{30}$ cycloalkyl group, an unsubstituted or substituted $C_3$-$C_{30}$ heterocycloalkyl group, an unsubstituted or substituted $C_3$-$C_{30}$ cycloalkyloxy group, or an unsubstituted or substituted $C_2$-$C_{100}$ alkyleneoxide group;

$Y^-$ is an anion;

a and b are each independently an integer of 1 to 5; and n is an integer of 500 to 2,800, and wherein the composite electrolyte does not include an ionic liquid other than the polymeric ionic liquid.

2. The composite electrolyte of claim 1, wherein the oligomer is at least one selected from poly(ethyleneglycol) methacrylate, poly(ethyleneglycol) acrylate, poly(ethyleneglycol) methyl ether methacrylate, poly(ethyleneglycol) phenyl ether acrylate, poly(ethyleneglycol) diacrylate, poly(ethyleneglycol) dimethacrylate, poly(ethyleneglycol) diamine, poly(ethyleneglycol) diglycidyl ether, poly(ethyleneglycol) bis(carboxymethyl) ether, poly(ethyleneglycol) dimethyl ether, poly(ethyleneglycol) dithiol, poly(ethyleneglycol), and poly(ethyleneglycol) methyl ether amine.

3. The composite electrolyte of claim 1, wherein a molecular weight of the oligomer is 1,000 Daltons or less.

4. The composite electrolyte of claim 1, wherein an amount of the oligomeric electrolyte is in a range of about 10 parts to about 500 parts by weight based on 100 parts by weight of the polymeric ionic liquid.

5. The composite electrolyte of claim 1, wherein the polymeric ionic liquid is at least one selected from a cationic polymeric ionic liquid, an anionic polymeric ionic liquid, and a zwitterionic polymeric ionic liquid.

6. The composite electrolyte of claim 1, wherein

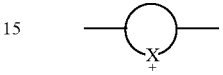

in Formula 1 is represented by Formula 2:

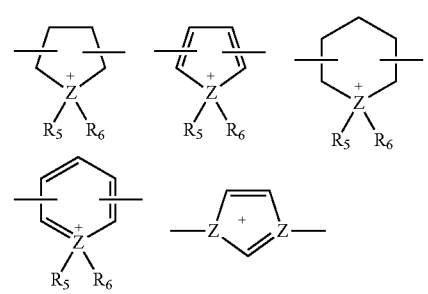

Formula 2 wherein, in Formula 2,

Z denotes N, S, or P; and ($R_5$) and $R_6$ are each independently a hydrogen, a $C_1$-$C_{30}$ alkyl group, a $C_1$-$C_{30}$ alkoxy group, a $C_6$-$C_{30}$ aryl group, a $C_6$-$C_{30}$ aryloxy group, a $C_3$-$C_{30}$ heteroaryl group, a $C_3$-$C_{30}$ heteroaryloxy group, a $C_3$-$C_{30}$ cycloalkyl group, a $C_3$-$C_{30}$ heterocycloalkyl group, or a $C_2$-$C_{100}$ alkyleneoxide group, provided that when Z denotes S, $R_5$ and $R_6$ are absent.

7. The composite electrolyte of claim 1, wherein the polymeric ionic liquid represented by Formula 1 is a polymeric ionic liquid represented by Formula 3:

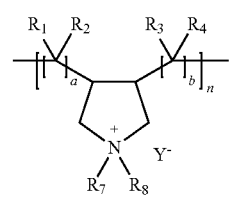

Formula 3 wherein, in Formula 3, $R_1$ to $R_8$ are each independently a hydrogen, an unsubstituted or substituted $C_1$-$C_{30}$ alkyl group, an unsubstituted or substituted $C_1$-$C_{30}$ alkoxy group, an unsubstituted or substituted $C_6$-$C_{30}$ aryl group, an unsubstituted or substituted $C_6$-$C_{30}$ aryloxy group, an unsubstituted or substituted $C_3$-$C_{30}$ heteroaryl group, an unsubstituted or substituted $C_3$-$C_{30}$ heteroaryloxy group, an unsubstituted or substituted $C_3$-$C_{30}$ cycloalkyl group, an unsubstituted or substituted $C_3$-$C_{30}$ heterocycloalkyl group, or an unsubstituted or substituted $C_2$-$C_{100}$ alkyleneoxide group;

Y⁻ is at least one selected from $BF_4^-$, $PF_6^-$, $AsF_6^-$, $SbF_6^-$, $AlCl_4^-$, $HSO_4^-$, $ClO_4^-$, $CH_3SO_3^-$, $CF_3CO_2^-$, $(CF_3SO_2)_2N^-$, $Cl^-$, $Br^-$, $I^-$, $BF_4^-$, $SO_4^-$, $PF_6^-$, $ClO_4^-$, $CF_3SO_3^-$, $CF_3CO_2^-$, $(C_2F_5SO_2)_2N^-$, $(C_2F_5SO_2)(CF_3SO_2)N^-$, and $(CF_3SO_2)_2N^-$;

a and b are each independently an integer of 1 to 5; and n is an integer of 500 to 2,800.

8. The composite electrolyte of claim 1, wherein the composite electrolyte further comprises a plurality of inorganic particles.

9. A lithium battery comprising:
a cathode;
an anode; and
an electrolyte layer disposed between the cathode and the anode,
wherein the electrolyte layer comprises the composite electrolyte of claim 1.

10. The lithium battery of claim 9, wherein a thickness of the electrolyte layer is within a range of about 100 nanometers to about 100 micrometers.

11. The lithium battery of claim 9, wherein the electrolyte layer is adjacent to and in contact with the anode.

12. The lithium battery of claim 9, wherein the electrolyte layer has a one-layer structure or a multi-layer structure comprising two or more layers, which are the same as or different.

13. The lithium battery of claim 12, wherein each of the two or more layers independently comprises at least one selected from a liquid electrolyte, a gel electrolyte, and a solid electrolyte.

14. The lithium battery of claim 9 further comprising a liquid electrolyte adjacent to and in contact with the cathode.

15. The lithium battery of claim 14, wherein the liquid electrolyte comprises an ionic liquid.

16. The lithium battery of claim 15, wherein the ionic liquid is represented by Formula 4 or Formula 5:

Formula 4 wherein, in Formula 4,

is a 3 to 31 membered group comprising 2 to 30 carbon atoms and optionally at least one heteroatom in addition to X, wherein the 3 to 31 membered group comprises an unsubstituted or substituted $C_3$-$C_{30}$ cycloalkyl ring, an unsubstituted or substituted $C_6$-$C_{30}$ aryl ring, or an unsubstituted or substituted $C_2$-$C_{30}$ heteroaryl ring;

X in Formula 4 is the same as or different from X in Formulae 1a or 1b and is independently S, —$N(R_5)(R_6)$, —$N(R_5)$, —$P(R_5)$, or —$P(R_5)(R_6)$; and $Y^{31}$ in Formula 4 is an anion, which is the same as or different from Y⁻ in Formula 1,

Formula 5 wherein, in Formula 5,

X in Formula 5 is the same as or different from X in Formulae 1 and 4 and is independently —$N(R_5)(R_6)$, —$N(R_5)$, —$P(R_6)$, or —$P(R_5)(R_6)$;

$R_{11}$ is an unsubstituted or substituted $C_1$-$C_{30}$ alkyl group, an unsubstituted or substituted $C_1$-$C_{30}$ heteroalkyl group, an unsubstituted or substituted $C_1$-$C_{30}$ alkoxy group, an unsubstituted or substituted $C_6$-$C_{30}$ aryl group, an unsubstituted or substituted $C_7$-$C_{30}$ arylalkyl group, an unsubstituted or substituted $C_6$-$C_{30}$ aryloxy group, an unsubstituted or substituted $C_6$-$C_{30}$ arylthio group, an unsubstituted or substituted $C_3$-$C_{30}$ heteroaryl group, an unsubstituted or substituted $C_4$-$C_{30}$ heteroarylalkyl group, an unsubstituted or substituted $C_3$-$C_{30}$ heteroaryloxy group, an unsubstituted or substituted $C_3$-$C_{30}$ heteroarylthio group, an unsubstituted or substituted $C_3$-$C_{30}$ cycloalkyl group, an unsubstituted or substituted $C_3$-$C_{30}$ cycloalkyloxy group, an unsubstituted or substituted $C_3$-$C_{30}$ heterocycloalkyl group, or an unsubstituted or substituted $C_2$-$C_{100}$ alkyleneoxide group;

$R_4$ and $R_5$ in Formulae 4 and 5 are the same as or different and are each independently a hydrogen, an unsubstituted or substituted $C_1$-$C_{30}$ alkyl group, an unsubstituted or substituted $C_1$-$C_{30}$ heteroalkyl group, an unsubstituted or substituted $C_1$-$C_{30}$ alkoxy group, an unsubstituted or substituted $C_6$-$C_{30}$ aryl group, an unsubstituted or substituted $C_7$-$C_{30}$ arylalkyl group, an unsubstituted or substituted $C_6$-$C_{30}$ aryloxy group, an unsubstituted or substituted $C_6$-$C_{30}$ arylthio group, an unsubstituted or substituted $C_3$-$C_{30}$ heteroaryl group, an unsubstituted or substituted $C_4$-$C_{30}$ heteroarylalkyl group, an unsubstituted or substituted $C_3$-$C_{30}$ heteroaryloxy group, an unsubstituted or substituted $C_3$-$C_{30}$ heteroarylthio group, an unsubstituted or substituted $C_3$-$C_{30}$ cycloalkyl group, an unsubstituted or substituted $C_3$-$C_{30}$ heterocycloalkyl group, an unsubstituted or substituted $C_3$-$C_{30}$ cycloalkyloxy group, or an unsubstituted or substituted $C_2$-$C_{100}$ alkyleneoxide group; and Y⁻ in Formula 5 is an anion, which is the same as or different from Y⁻ in Formulae 1 and 4.

17. The lithium battery of claim 16, wherein

in Formula 4 is a cation represented by Formula 6, and

in Formula 5 is a cation represented by Formula 7:

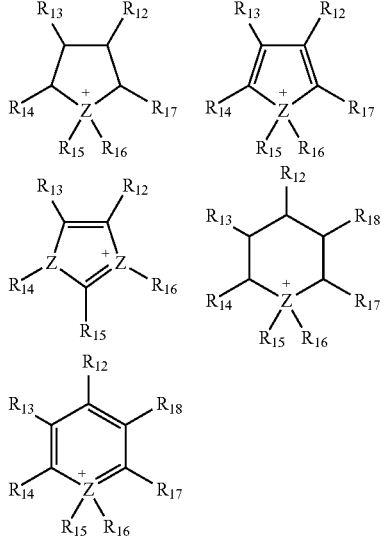

Formula 6

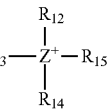

Formula 7 wherein, in Formula 6,

Z denotes S, N or P; and $R_{12}$ to $R_{18}$ are each independently a hydrogen, an unsubstituted or substituted $C_1$-$C_{30}$ alkyl group, an unsubstituted or substituted $C_1$-$C_{30}$ alkoxy group, an unsubstituted or substituted $C_6$-$C_{30}$ aryl group, an unsubstituted or substituted $C_6$-$C_{30}$ aryloxy group, an unsubstituted or substituted $C_3$-$C_{30}$ heteroaryl group, an unsubstituted or substituted $C_3$-$C_{30}$ heteroaryloxy group, an unsubstituted or substituted $C_3$-$C_{30}$ cycloalkyl group, an unsubstituted or substituted $C_3$-$C_{30}$ heterocycloalkyl group, or an unsubstituted or substituted $C_2$-$C_{100}$ alkyleneoxide group, provided that when Z denotes S, $R_5$ and $R_6$ are absent;

wherein, in Formula 7,

Z denotes N or P; and $R_{12}$ to $R_{15}$ are each independently a hydrogen, an unsubstituted or substituted $C_1$-$C_{30}$ alkyl group, an unsubstituted or substituted $C_1$-$C_{30}$ alkoxy group, an unsubstituted or substituted $C_6$-$C_{30}$ aryl group, an unsubstituted or substituted $C_6$-$C_{30}$ aryloxy group, an unsubstituted or substituted $C_3$-$C_{30}$ heteroaryl group, an unsubstituted or substituted $C_3$-$C_{30}$ heteroaryloxy group, an unsubstituted or substituted $C_3$-$C_{30}$ cycloalkyl group, an unsubstituted or substituted $C_3$-$C_{30}$ heterocycloalkyl group, or an unsubstituted or substituted $C_2$-$C_{100}$ alkyleneoxide group.

18. The lithium battery of claim 9 further comprising a separator disposed between the cathode and the composite electrolyte layer.

19. The lithium battery of claim 9 further comprising a layer disposed between the cathode and the anode, wherein the layer comprises at least one selected from $Cu_3N$, $Li_3N$, LiPON, $Li_3PO_4.Li_2S.SiS_2$, $Li_2S.GeS_2.Ga_2S_3$, $Li_2O.11Al_2O_3$, $Na_2O.11Al_2O_3$, $(Na,Li)_{1+x}Ti_{2-x}Al_x(PO_4)_3$ (wherein $0.1 \leq x \leq 0.9$), $Li_{1+x}Hf_{2-x}Al_x(PO_4)_3$ (wherein $0.1 \leq x \leq 0.9$), $Na_3Zr_2Si_2PO_{12}$, $Li_3Zr_2Si_2PO_{12}$, $Na_5ZrP_3O_{12}$, $Na_5TiP_3O_{12}$, $Na_3Fe_2P_3O_{12}$, $Na_4NbP_3O_{12}$, a Na-Silicate, $Li_{0.3}La_{0.5}TiO_3$, $Na_5MSi_4O_{12}$ (wherein, M is a rare earth element, such as Nd, Gd, or Dy), $Li_5ZrP_3O_{12}$, $Li_5TiP_3O_{12}$, $Li_3Fe_2P_3O_{12}$, $Li_4NbP_3O_{12}$, $Li_{1+x}(M,Al,Ga)_x(Ge_{1-y}Ti_y)_{2-x}(PO_4)_3$ (wherein, $0.1 \leq x \leq 0.8$, $0 \leq y \leq 1.0$, and M is Nd, Sm, Eu, Gd, Tb, Dy, Ho, Er, Tm, or Yb), $Li_{1+x+y}Q_xTi_{2-x}Si_yP_{3-y}O_{12}$ (wherein, $0 < x \leq 0.4$, $0 < y \leq 0.6$, and Q is Al or Ga), $Li_6BaLa_2Ta_2O_{12}$, $Li_7La_3Zr_2O_{12}$, $Li_5La_3Nb_2O_{12}$, $Li_5La_3M_2O_{12}$ (wherein, M is Nb or Ta), and $Li_{7+x}A_xLa_{3-x}Zr_2O_{12}$ (wherein, $0 < x < 3$, and A is Zn).

* * * * *